US012701503B2

(12) United States Patent
Olvera-Hernandez et al.

(10) Patent No.: US 12,701,503 B2
(45) Date of Patent: Aug. 4, 2026

(54) ENABLING NON-ACCESS STRATUM-AS-A-SERVICE

(71) Applicant: InterDigital Patent Holdings, Inc., Wilmington, DE (US)

(72) Inventors: Ulises Olvera-Hernandez, Saint-Lazare (CA); Sebastian Robitzsch, London (GB); Xavier De Foy, Kirkland (CA); Michael Starsinic, Newtown, PA (US); Michel Roy, Candiac (CA); Samir Ferdi, Kirkland (CA); Saad Ahmad, Montreal (CA); Robert Gazda, Spring City, PA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 4 days.

(21) Appl. No.: 18/838,776

(22) PCT Filed: Feb. 17, 2023

(86) PCT No.: PCT/US2023/013282
§ 371 (c)(1),
(2) Date: Aug. 15, 2024

(87) PCT Pub. No.: WO2023/158781
PCT Pub. Date: Aug. 24, 2023

(65) Prior Publication Data
US 2025/0184881 A1    Jun. 5, 2025

Related U.S. Application Data

(60) Provisional application No. 63/311,410, filed on Feb. 17, 2022.

(51) Int. Cl.
*H04W 48/18*     (2009.01)
*H04L 67/51*     (2022.01)
*H04W 48/16*     (2009.01)

(52) U.S. Cl.
CPC ............. *H04W 48/18* (2013.01); *H04L 67/51* (2022.05); *H04W 48/16* (2013.01)

(58) Field of Classification Search
CPC ... H04W 48/18; H04W 48/16; H04W 12/037; H04W 12/06; H04W 12/12; H04L 67/51; H04L 67/63
See application file for complete search history.

(56) References Cited

U.S. PATENT DOCUMENTS

| | | | | |
|---|---|---|---|---|
| 12,284,525 B2 * | 4/2025 | Wang | | H04L 67/51 |
| 2016/0337239 A1 * | 11/2016 | Nasielski | | H04L 47/11 |

(Continued)

FOREIGN PATENT DOCUMENTS

| | | |
|---|---|---|
| WO | 2021/041467 A1 | 3/2021 |
| WO | 2021/092441 A1 | 5/2021 |
| WO | 2022/125855 A1 | 6/2022 |

OTHER PUBLICATIONS

3rd Generation Partnership Project (3GPP), S2-1902051, "Introduction of Indirect Communication between NF services, and Implicit Discovery", China Mobile, SA2, 3GPP TSG-SA2 Meeting #131, Santa Cruz—Tenerife, Spain, Feb. 25-Mar. 1, 2019, 17 pages.

(Continued)

*Primary Examiner* — Benjamin M Thieu
(74) *Attorney, Agent, or Firm* — Chris Kolefas

(57) ABSTRACT
The WTRU may determine that it has a need to request a NAS network service and may generate an application layer NAS message that comprises the request. The WTRU may determine, based on configuration information, one or more network nodes configured to provide NAS network services. The WTRU may determine, based on analytics data and (Continued)

policy data, a first network node in the one or more network nodes to which the application layer NAS message may be sent. The WTRU may determine, based on the policy data, one or more parameters for sending the application layer NAS message to the first network node. The WTRU may determine an endpoint address associated with the first network node. The WTRU may send the application layer NAS message to the first network node using the endpoint address and the one or more parameters.

20 Claims, 29 Drawing Sheets

(56) References Cited

U.S. PATENT DOCUMENTS

| | | | | |
|---|---|---|---|---|
| 2022/0141662 A1* | 5/2022 | Liao | | H04W 12/08 |
| | | | | 726/1 |
| 2023/0109272 A1* | 4/2023 | Ryu | | H04L 63/0892 |
| | | | | 370/329 |
| 2023/0266961 A1 | 8/2023 | Robitzsch et al. | | |
| 2025/0039695 A1* | 1/2025 | Suh | | H04W 12/06 |

OTHER PUBLICATIONS

3rd Generation Partnership Project (3GPP), S2-2000678, "Solution for the KI#2: PSA Relocation with Support of Service Continuity or Not", Lenovo, Motorola Mobility, 3GPP TSG-SA2 Meeting #136AH, Incheon, KR, Jan. 13-17, 2020, pp. 1-5.
3rd Generation Partnership Project (3GPP). TR 23.758 V17.0.0, "Technical Specification Group Services and System Aspects, Study on application architecture for enabling Edge Applications, (Release 17)", Dec. 2019, pp. 1-113.
3rd Generation Partnership Project (3GPP), TS 23.501 V15.2.0, "Technical Specification Group Services and System Aspects, System Architecture for the 5G System, Stage 2 (Release 15)", Jun. 2018, pp. 1-217.
3rd Generation Partnership Project (3GPP), TS 23.501 V17.3.0, "Technical Specification Group Services and System Aspects, Sys-tem architecture for the 5G System (5GS), Stage 2 (Release 17)", Dec. 2021, pp. 1-559.
3rd Generation Partnership Project (3GPP), TS 23.502 V17.3.0, "Technical Specification Group Services and System Aspects, Pro-cedures for the 5G System (5GS), Stage 2 (Release 17)", Dec. 2021, pp. 1-727.
3rd Generation Partnership Project (3GPP), TS 23.503 V17.3.0, "Technical Specification Group Services and System Aspects, Policy and charging control framework for the 5G System (5GS), Stage 2 (Release 17)", Dec. 2021, pp. 1-144.
3rd Generation Partnership Project (3GPP), TS 23.558 V17.2.0, "Technical Specification Group Services and System Aspects, Archi-tecture for enabling Edge Applications, (Release 17)", Dec. 2021, pp. 1-163.
3rd Generation Partnership Project (3GPP), TS 29.500 V17.5.0, "Technical Specification Group Core Network and Terminals, 5G System, Technical Realization of Service Based Architecture, Stage 3 (Release 17)", Dec. 2021, pp. 1-117.
"Hotspot 2.0 (Release 2) Technical Specification", WiFi Alliance Technical Committee, Hotspot 2.0 Technical Task Group, 41 pages.
Adam, "The Twelve-Factor App", Online, https://12factor.net/, Oct. 29, 2024, pp. 1-3.
Bishop M., "Hypertext Transfer Protocol Version 3 (HTTP/3)", IETF draft, https://datatracker.ietf.org/doc/html/draft-ietf-quic-http-34, Feb. 2, 2021, pp. 1-66.
Hamilton R., "Bootstrapping WebSockets with HTTP/3", Work in Progress, Internet-Draft, draft-ietf-httpbis-h3-websockets-00, https://datatracker.ietf.org/doc/html/draft-ietf-httpbis-h3-websockets-00, Sep. 10, 2021, pp. 1-4.
Iyengar et al., "Quic: A UDP-Based Multiplexed and Secure Trans-port", RFC9000, Available online at: https://datatracker.ietf.org/doc/html/rfc9000, May 2021, pp. 1-161.
Mcmanus P., "Bootstrapping WebSockets with HTTP/2", RFC 8441, DOI 10.17487/RFC8441, Available online at: https://datatracker.ietf.org/doc/html/rfc8441, Sep. 2018, pp. 1-8.
Schinazi et al., "HTTP Datagrams and the Capsule Protocol", Available online at: https://datatracker.ietf.org/doc/html/draft-ietf-masque-h3-datagram, Jun. 17, 2022, pp. 1-15.
Schinazi D., "Proxying UDP in HTTP", Available online at: https://datatracker.ietf.org/doc/html/draft-ietf-masque-connect-udp, Jun. 17, 2022, pp. 1-16.

* cited by examiner

FIG. 16

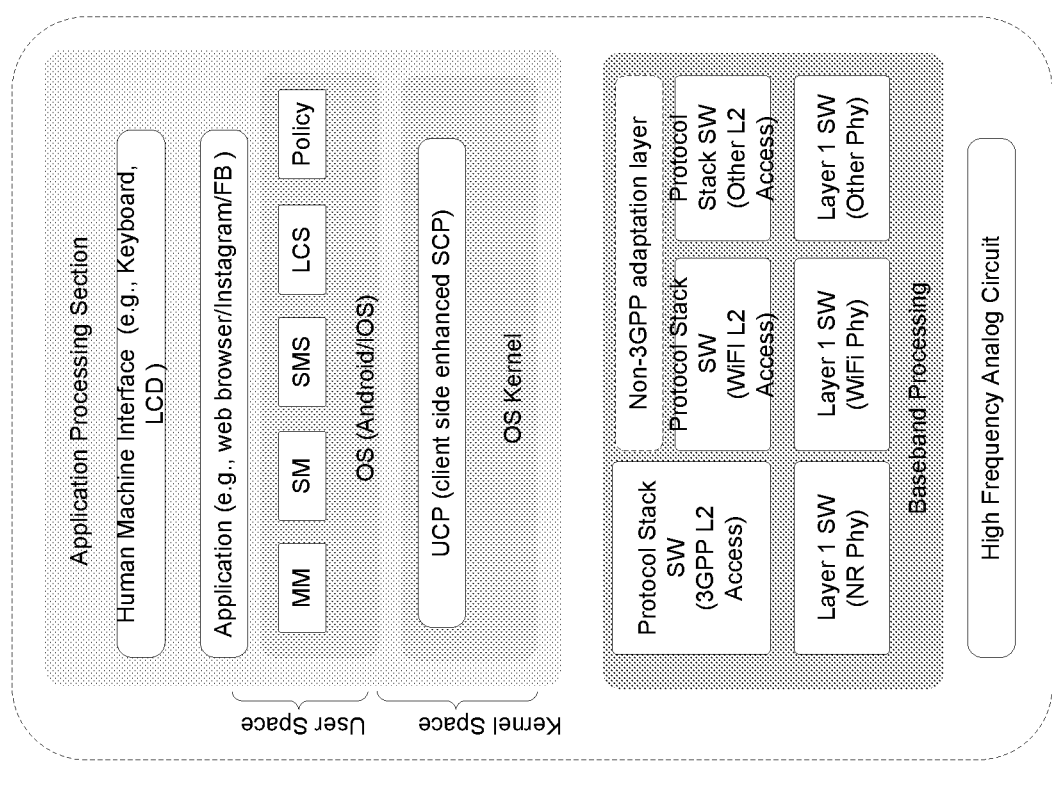
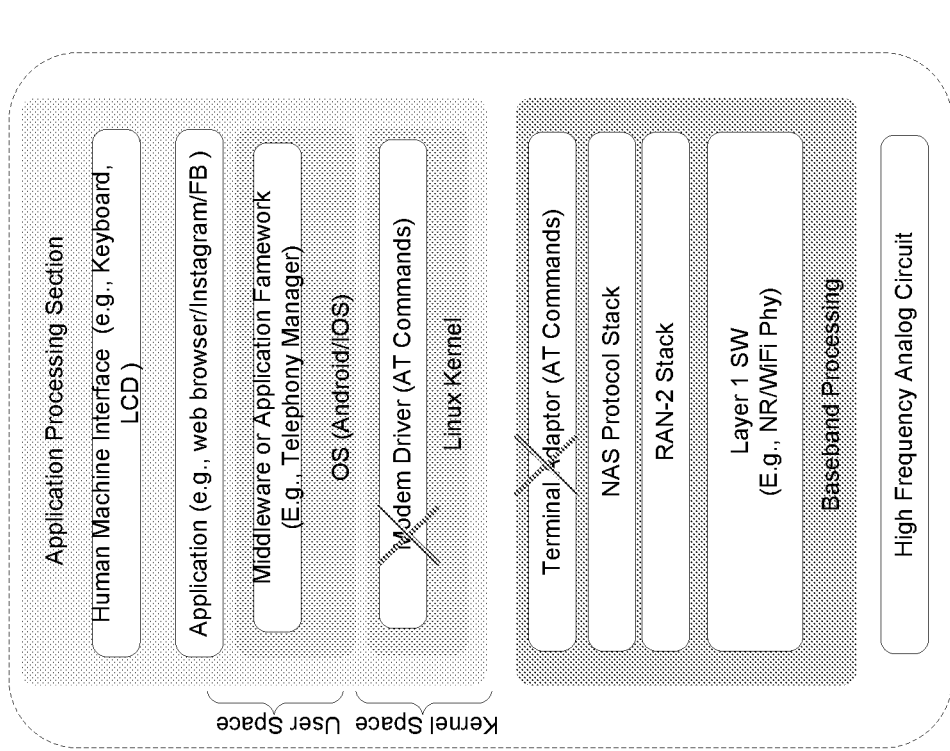
FIG. 18

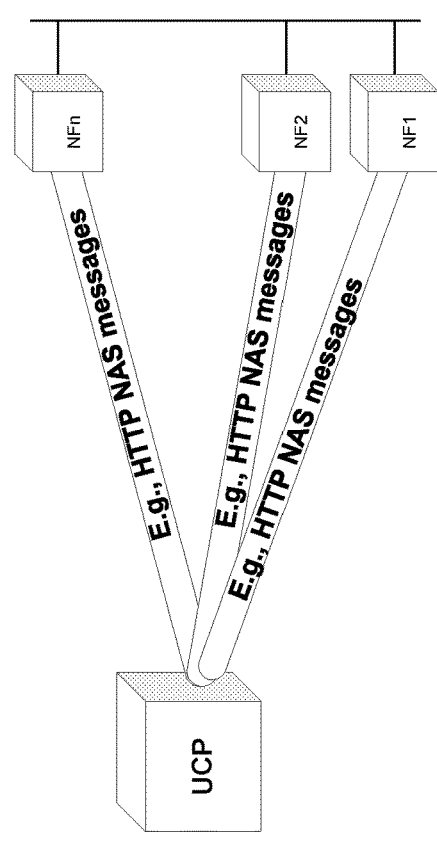
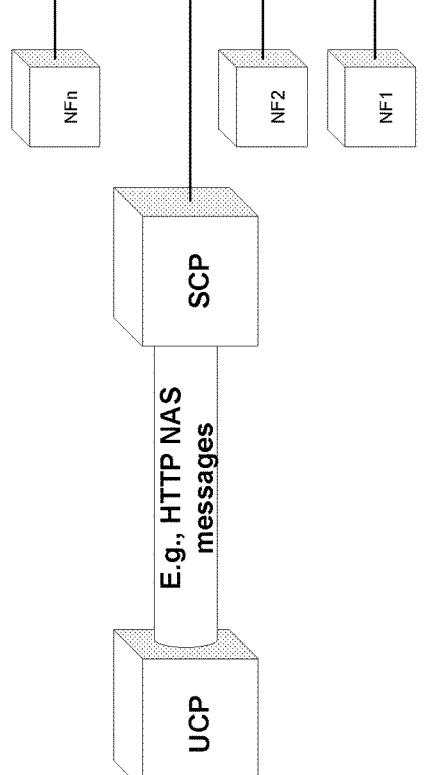
FIG. 19

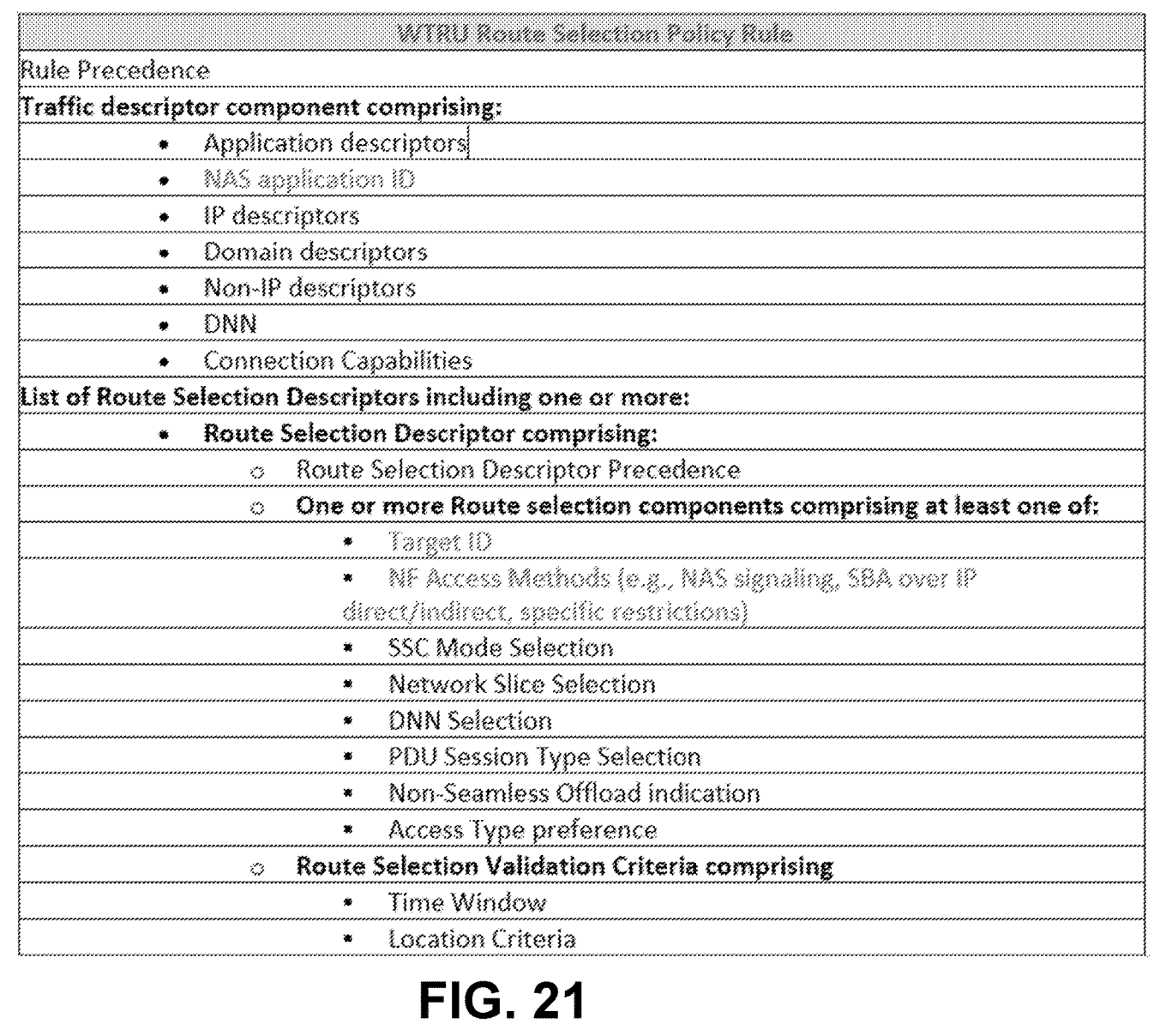

*WTRU Route Selection Policy Rule*

*Rule Precedence*

Traffic descriptor component comprising:

* Application descriptors
* NAS application ID
* IP descriptors
* Domain descriptors
* Non-IP descriptors
* DNN
* Connection Capabilities

List of Route Selection Descriptors including one or more:

* Route Selection Descriptor comprising:
  * Route Selection Descriptor Precedence
  * One or more Route selection components comprising at least one of:
    * Target ID
    * NF Access Methods (e.g., NAS signaling, SBA over IP direct/indirect, specific restrictions)
    * SSC Mode Selection
    * Network Slice Selection
    * DNN Selection
    * PDU Session Type Selection
    * Non-Seamless Offload indication
    * Access Type preference
  * Route Selection Validation Criteria comprising
    * Time Window
    * Location Criteria

FIG. 21

ENABLING NON-ACCESS STRATUM-AS-A-SERVICE

CROSS-REFERENCE TO RELATED APPLICATION

This application is the National Stage Entry under 35 U.S.C. § 371 of Patent Cooperation Treaty Application No. PCT/US2023/013282, filed Feb. 17, 2023, which claims the benefit of U.S. Provisional Patent Application No. 63/311, 410, filed Feb. 17, 2022, the contents of all which are hereby incorporated herein by reference in their entireties.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are disclosed for communicating application layer non-access stratum (NAS) messages for accessing a NAS network service to a network node.

A wireless transmit and receive unit (WTRU) may determine that it has a need to request a NAS network service. The WTRU may generate an application layer NAS message that comprises the request for the NAS network service.

The WTRU may determine, based on configuration information, one or more network nodes configured to provide network services. The WTRU may be provisioned with configuration information about network nodes in the network including, for example, network node addresses for network functions (NFs) and service communication proxies (SCPs). The WTRU may determine, based on the configuration information, network nodes that provide services such as the NAS network service corresponding to the application layer NAS message.

The WTRU may determine, based on analytics data and policy data, a first network node in the one or more network nodes to which the application layer NAS message may be sent. The analytics data may comprise data regarding network nodes that may have been collected by a network data analytics function (NAWDF). The analytics data may have been prepared using artificial intelligence (AI) and/or machine learning (ML). The policy data may comprise data specifying rules for selecting nodes associated with providing particular NAS services. The WTRU may apply the rules to select a network node that may have been identified in the analytics data.

The WTRU may determine, based on the policy data, one or more parameters for sending the application layer NAS message to the first network node. The policy data may comprise one or more rules for selecting parameters for communicating with the first network node. The one or more rules may be determined based on a NAS application identifier associated with the particular NAS application message. Depending on the NAS application identifier, the WTRU may apply corresponding rules and rule-specified parameters. The rule-specified parameters may indicate implementations for sending communications to the first network node. For example, the parameters may indicate to perform direct communication with the first network node or indirect communication with the first network node.

The WTRU may determine an endpoint address associated with the first network node. The WTRU may determine the endpoint address by sending a request for the endpoint address to a network repository function (NRF) and receiving a response indicating the endpoint address.

The WTRU may send the application layer NAS message to the first network node using the endpoint address and the one or more parameters. The first network node may be, for example, a network function (NF) configured to provide the NAS network service. The WTRU may send the application layer NAS message to a service communication proxy (SCP) configured to forward the application layer NAS message to a NF configured to provide the NAs network service. The WTRU may send the application layer NAS message using an application layer protocol such as, for example, HTTP.

Systems, methods, and instrumentalities are disclosed herein for enabling non-access stratum (NAS)-as-a-service. NAS may be a control plane mechanism, such as a 3GPP Control Plane mechanism. For example, NAS may be used as a protocol, and applicable messages (which may be used in 3GPP Networks) may enable the WTRU to access services from a network (e.g., a 3GPP Network). NAS messages may be enabled to operate at the application layer, e.g., instead of inside the modem, and procedures may enable services to run independently from one another, which may be the result of decoupling mobility/location update and access functionality from network connectivity and/or session management, or any other current and/or future service such as location services, messaging services, and the like.

The WTRU may execute NAS functionality from a service layer as opposed to through a dedicated interface housed in layer 2 within an access network modem. The WTRU may access NAS service(s) in the core network independently from one another. The WTRU may decouple NAS service operation from access network (e.g., specific access network). The WTRU may enable a communication proxy, which may be referred to as a WTRU communication proxy (UCP) to execute communication procedures (e.g., all communication procedures) between the service NAS entities and the core network counterparts. This may include routing of HTTP-based NAS messages, harmonization of access network procedures and support for legacy operations (e.g., when the UCP is used with legacy Access Stratum stacks. The WTRU may enable policies (e.g., via WTRU route selection policy (URSP) rules) to configure the WTRU communication proxy (UCP) entity operation. The WTRU may forward messages to any Network Function (NF) in the 3GPP Network, by using a universally standardized name for identifying a target NF, the UCP may be configured to execute a translation between a universally standardized name and an IP address or fully qualified domain name (FQDN). The WTRU may support a transparent radio bearer to enable transparent transport of service NAS messages across the NR layer 2 and layer 3 layers.

BRIEF DESCRIPTION OF THE DRAWINGS

FIG. 16 is a diagram illustrating an example of data flow at the Access Stratum showing transparent radio bearer (TRB).

FIG. 18 is a diagram illustrating example service independent high-level software architecture.

FIG. 19 is a diagram illustrating secure NAS communication over one or more service communication proxies (SCPs).

FIG. 21 is a diagram illustrating an example of a control-Plane WTRU route selection policy rule.

DETAILED DESCRIPTION

Figure 1A:
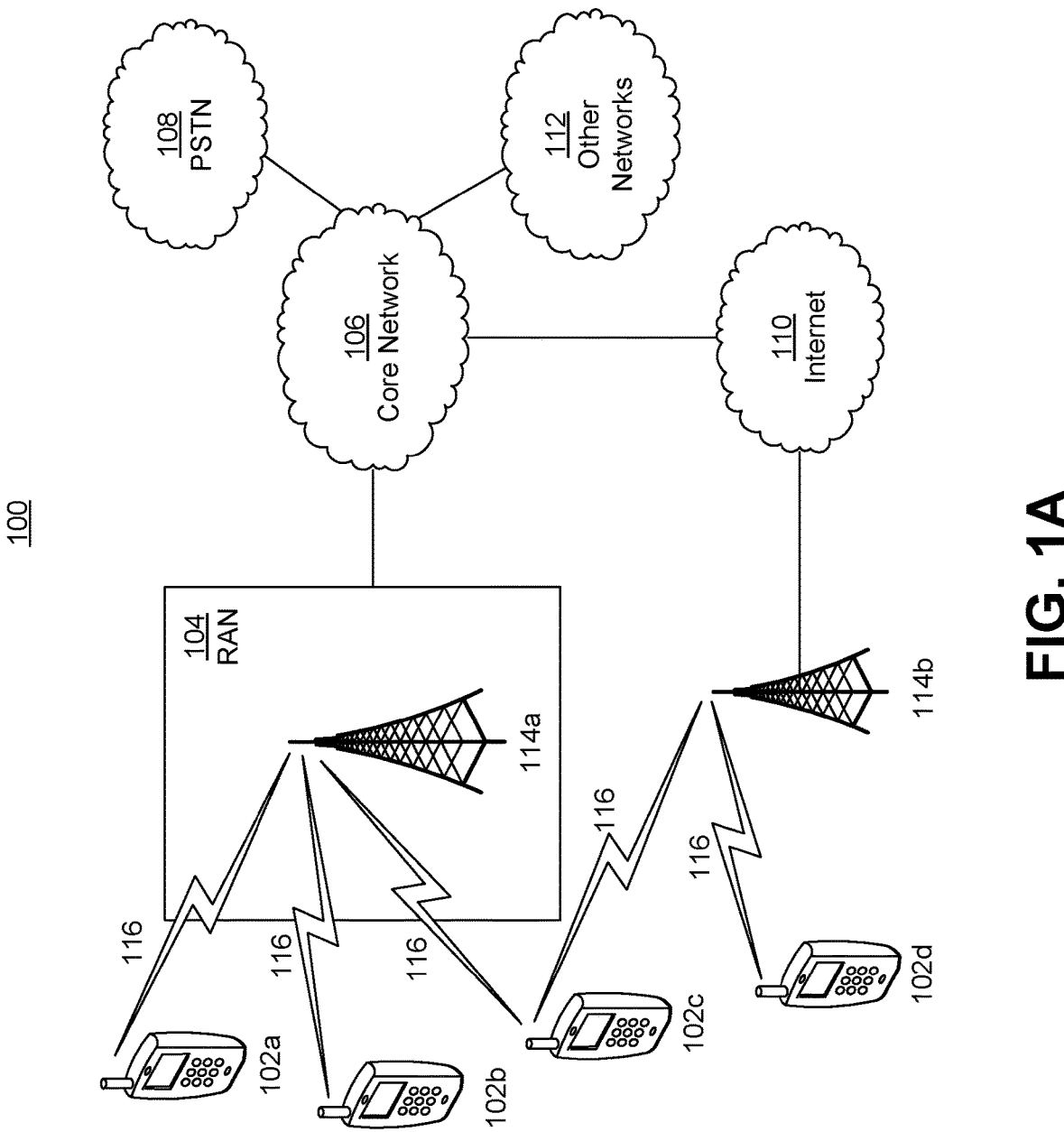
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
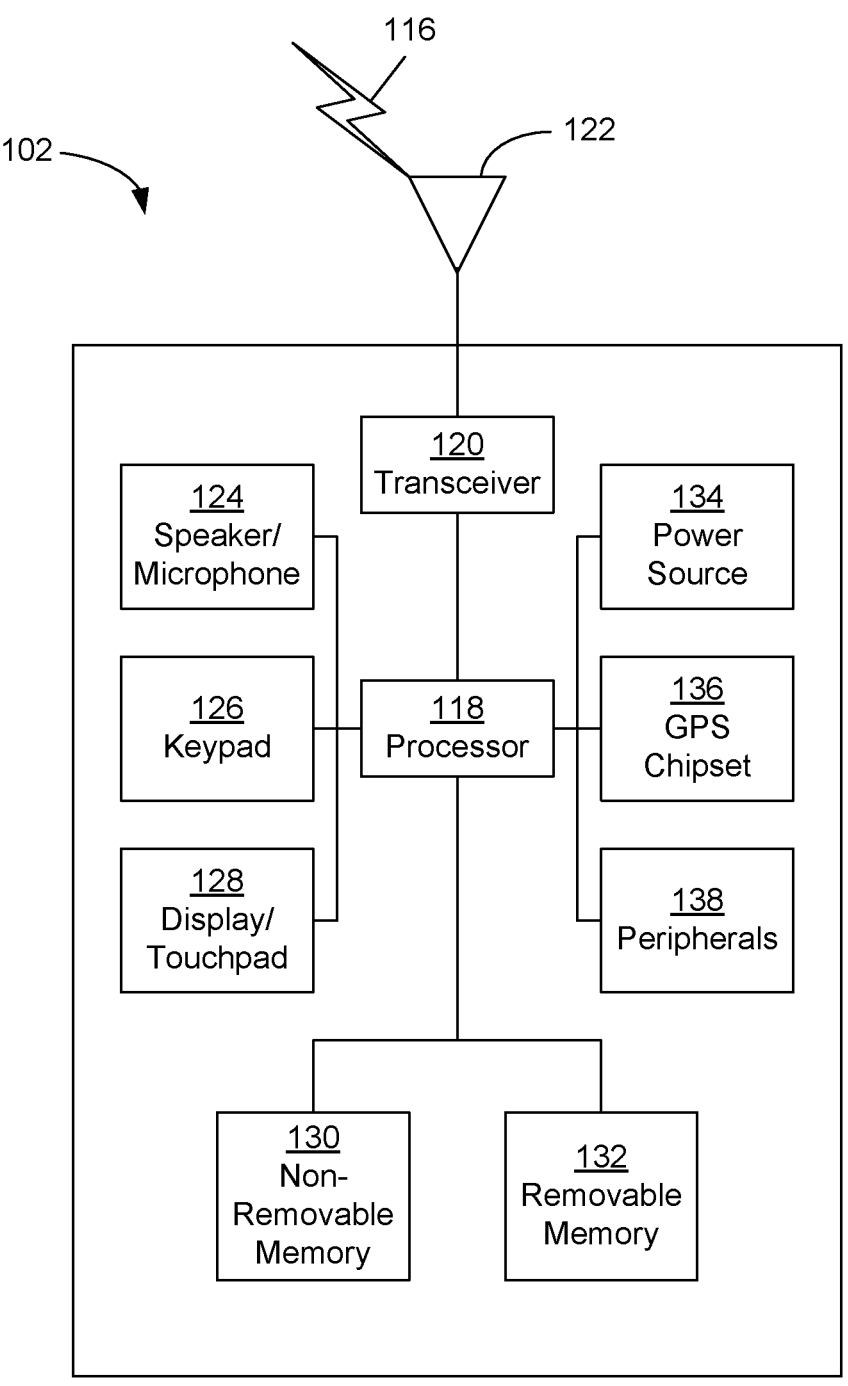
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
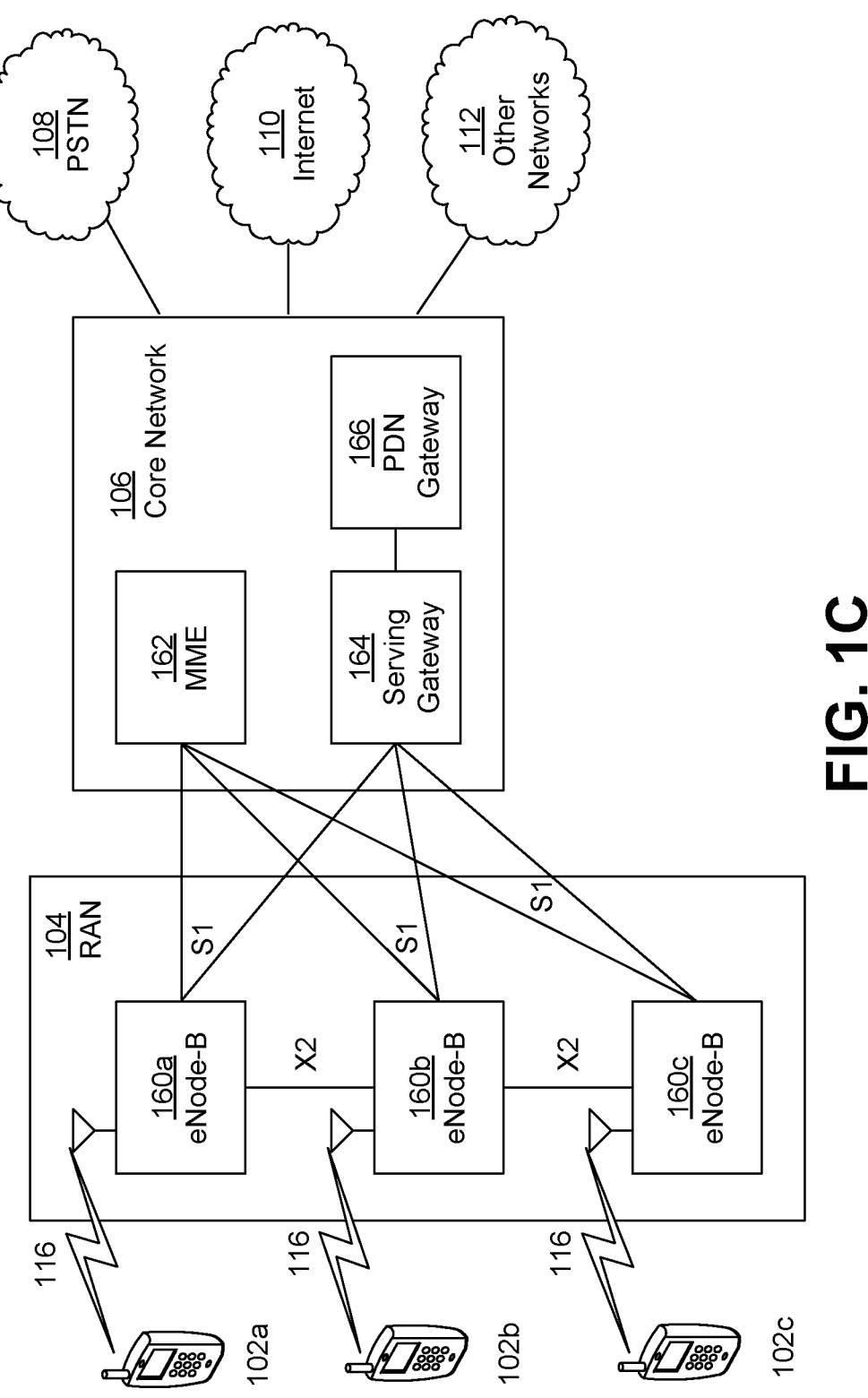
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
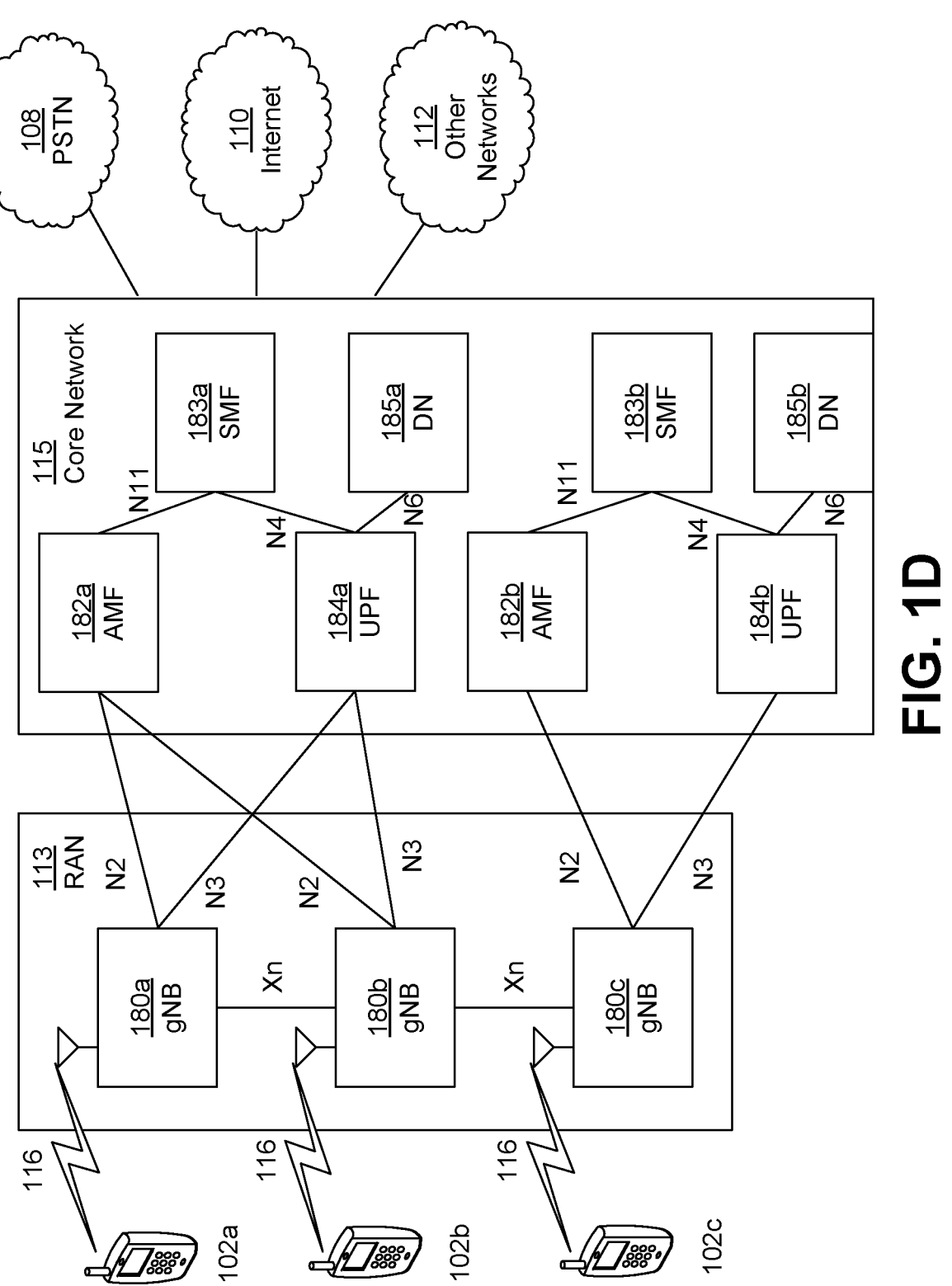
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Reference to a timer herein may refer to a time, a time period, tracking the time, tracking the period of time, etc. Reference to a timer expiration herein may refer to determining that the time has occurred or that the period of time has expired.

Figure 2:
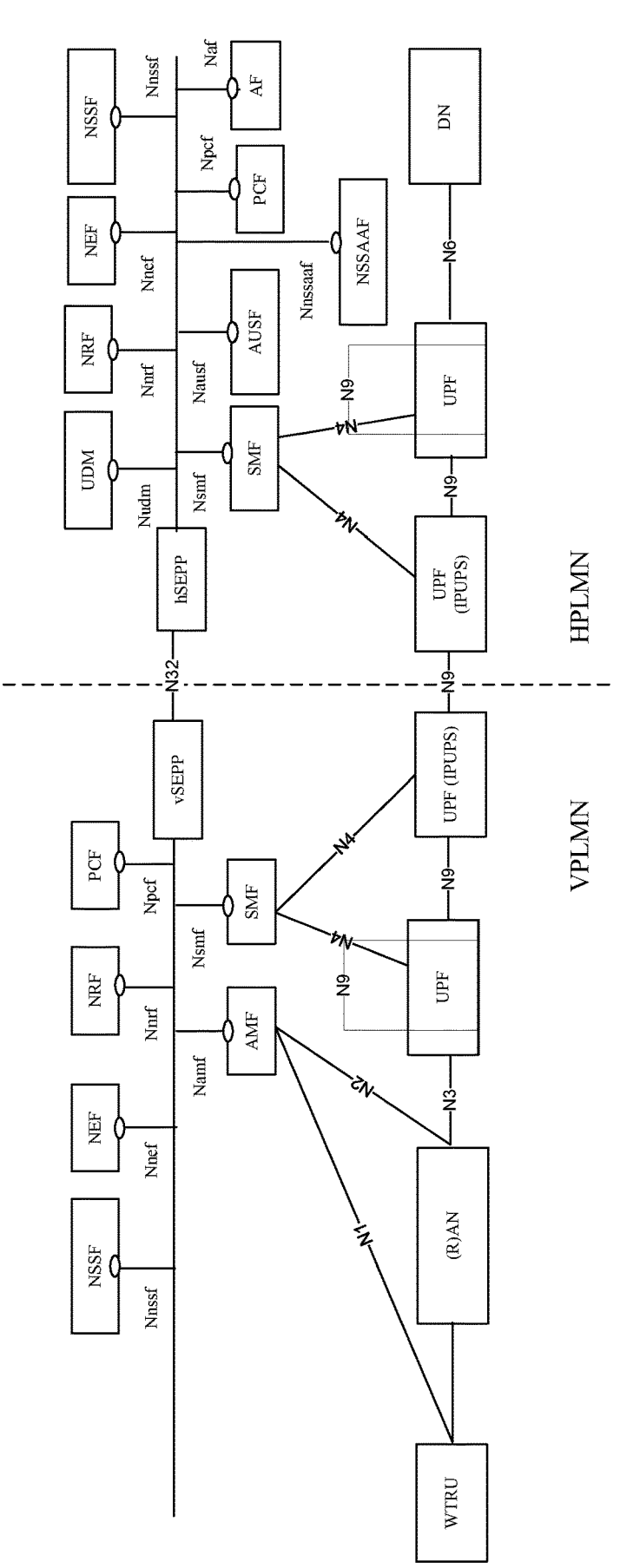
FIG. 2 is a diagram illustrating an example roaming system architecture service-based interface (SBI).

Cloud native concept(s) and/or implication(s) in service-based interface (SBI) architecture may be associated with service-based architecture (SBA). The evolved packet core network functions (NFs) may be split into smaller NFs regarding their functionality, scope, and/or the definition of SBIs for their communication among each other. The communication pattern may utilize hypertext transfer protocol/2 (HTTP/2) as the application layer protocol paving the way for core (e.g., 5GC) NFs as microservices following the 12-factor app software engineering paradigm. SBI-enabled interfaces (e.g., all SBI-enabled interfaces) may be named from non-SBIs in the system architecture, as shown in FIG. 2 (e.g., non-SBI-enabled interfaces start with N followed by a number such as N1, while SBI-enabled interfaces start with N followed by the NF's acronym such as Namf). FIG. 2 shows an example roaming system, e.g., 5G roaming system, architecture SBI representation.

Based on SBI-enabled NFs as microservices, the provisioning of NFs as cloud native network functions (CNFs) may be used. Microservices may be characterized by a software engineering paradigm, which may be referred to as the 12-factor app methodology. The methodology may allow the disintegration of monolithic software components into a set of mainly stateless microservices that externalize functionality (e.g., any functionality) that is not related to the microservice (e.g., logging, keeping state, balancing request to cope with an increase of requests, and/or the like). CNFs may orchestrate (e.g., as in provision and/or lifecycle manage CNFs) microservices across a range of computing hosts and may externalize the ability to scale them up/down or out/in through procedures (e.g., automated procedures). Using stateless application layer protocols (e.g., HTTP) may allow to scale a service in a direction (e.g., any direction) knowing instances (e.g., new instances) may take over the processing of requests and/or responses if they obtain the state from where the old instance left the processing of a request. This may be referred to as cloud native, which may be applied to SBI-enabled NFs. One or more interfaces of a system architecture on the control plane may be SBI-enabled.

In contrast to a cloud native system, with RESTful interfaces, (e.g., in 3GPP 5G systems), an NAS application may be designed to route messages (e.g., all messages), e.g., regardless of their nature (e.g., mobility management or session management) to a central anchor point, (e.g., the 5GC NF AMF, where all other message types go through, even if they are intended for a server providing a different functionality from what the anchor server may provide, unlike a typical service-based application that relies on RESTful interfaces).

The NAS client may neither contact the CN Server directly, nor choose which server to route messages, e.g., since routing of NAS messages is a constraint by the access network processing NAS messages, as described herein, which may be regardless of what access network is used (e.g., 3GPP or Non-3GPP).

Access networks and its implications in the NAS Protocol may provide a common core network regardless of the access network interfacing to it. Core network systems may provide a common interface to access networks (e.g., all Access Networks), an interface that may be referred to as N2.

WTRU(s) may access the core network through the NAS protocol, which may enable the WTRU to request service(s) such as mobility, reachability, authentication, security, and/or data connectivity. If the WTRU is authorized to avail of these services, the core network may use the NAS protocol to control how these services are provided to the WTRU(s). NAS messaging may be messaging that is used to perform procedures that are related to network registration, emergency network registration, mobility management, session management, network slice registration, policy configuration, short message services, location services, capability negotiation, service requests, periodic network registrations, and small data transfers. The NAS protocol may be encapsulated in N2 frames that are sent to core network functions for processing. In the case of an access network, the NAS protocol may run over a stream control transmission protocol (SCTP) static connection between the gNB and the AMF. A WTRU may access services through a Wi-Fi connection that provides internet access to the WTRU.

Networks (e.g., 5G capable 3GPP networks) may enable connectivity from access networks that are trusted or untrusted, e.g., depending on whether the access entity in the network is within the realm of the network or whether the network access entity in the network has established a trust relationship with the network (e.g., 3GPP network).

Figure 3:
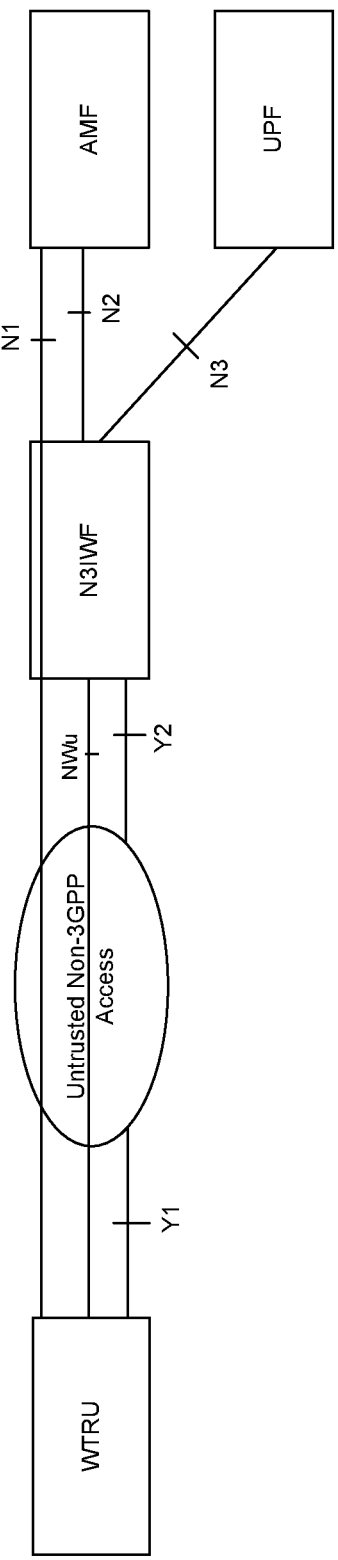
FIG. 3 is a diagram illustrating an example core network with untrusted access.
Figure 4:
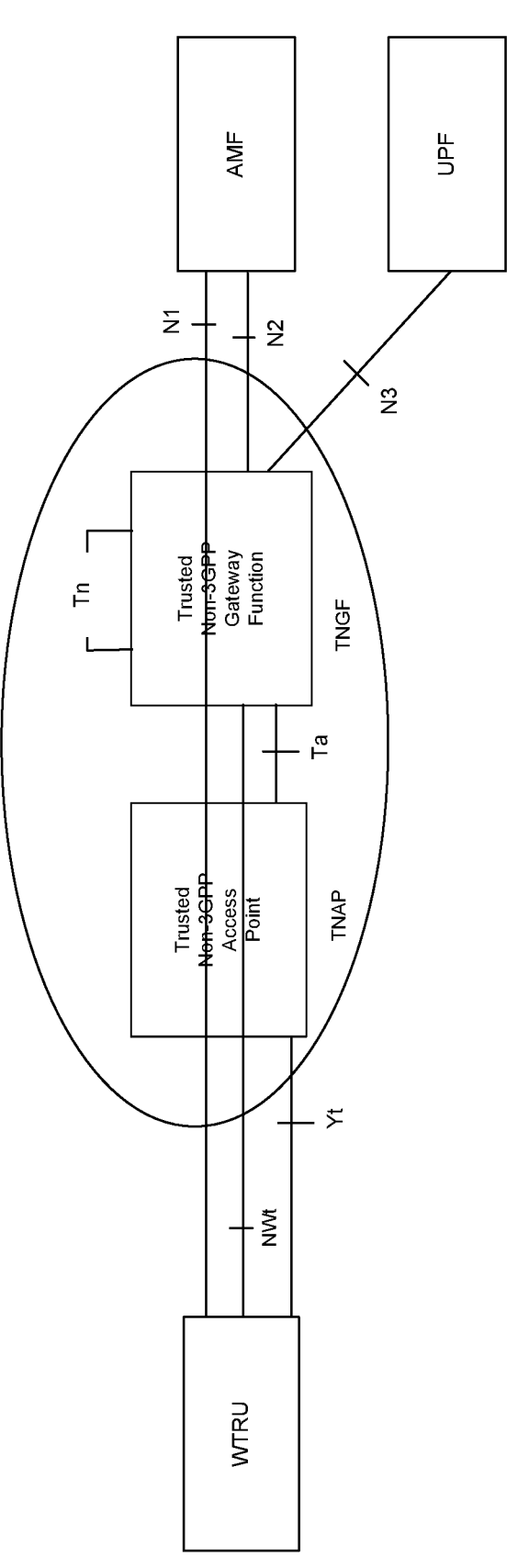
FIG. 4 is a diagram illustrating an example core network with trusted access.

As shown in FIG. 3 and FIG. 4, an untrusted and a trusted non-3GPP access network may be provided. In the case of an untrusted access network, access to the network may be secured through an interworking function that provides secure access to a cellular network operator. The functional entity may be referred to as non-3GPP interworking function (N3IWF).

If the WTRU gains data connectivity (e.g., Internet connectivity), the WTRU may find a N3IWF, either through a preconfigured and proprietary procedure, or by using domain name service (DNS) procedures. The WTRU may establish a secure tunnel using an internet engineering task force (IETF) protocol, which may be referred to as IPSec to enable the WTRU to send NAS messages to core network entities in a secure manner.

Figure 5:
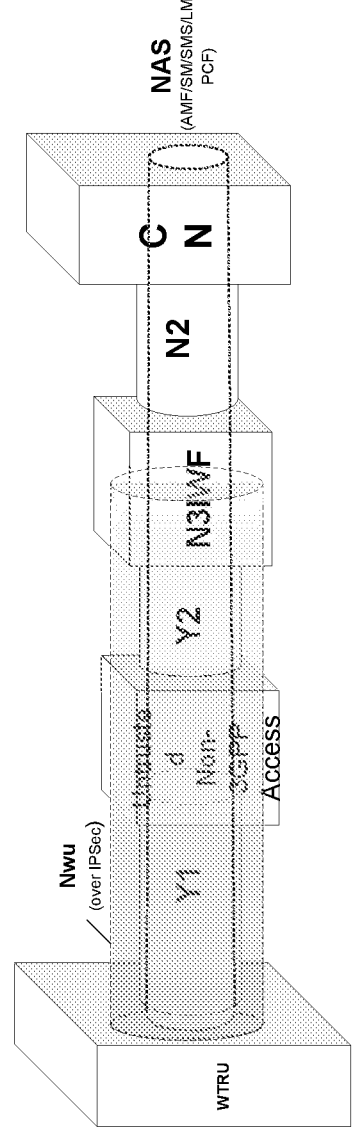
FIG. 5 is a diagram illustrating example secure non-access stratum (NAS) messaging over an Internet Protocol Security (IPSec) tunnel supporting access.

FIG. 3 shows an example of a core network with untrusted access. FIG. 4 shows an example of a core network with trusted access. FIG. 5 shows an example of secure NAS messaging over an IPSec tunnel supporting access.

The secure tunnel (e.g., as shown in FIG. 5) may be referred to as NWu interface. A set of network interfaces may be described herein. As described herein, trusted access may be offered, for example, if the access network is located within the trust domain of a mobile network operator (MNO).

The initial access network selection, how the communication channel is secured to enable the transfer of control (e.g., NAS) data, and the allocation of an IP address to enable the WTRU to contact the N3IWF, e.g., when the WTRU accesses the core network via an N3IWF, may be provided.

In the case of trusted access, as shown in FIG. 4, the access node may be selected based on supported public land mobile networks (PLMNs) on the trusted access point. The WTRU may access the trusted access point over L2 and may get an IP allocation (e.g., by the 5GC NF Session Management Function (SMF) once the trusted access node is authenticated.

The access techniques described herein (e.g., as shown in FIG. 3 and FIG. 4) may enable secure control plane connectivity (e.g., transport of NAS messages) between the WTRU and the core network through the establishment of an IPSec-based secure tunnel.

The routing of NAS application messages between the NAS client in the WTRU and intended for an NAS server in the core network server/data center able to act upon the messages, may not be based on service-based mechanisms. The messages may be routed through the use of intermediate network entities (e.g., the N3IWF in the untrusted AN case or a trusted gateway function (TNFG) in the trusted AN case). How the intermediate nodes are able to route messages to the correct NAS Server in the core network may be based on an Operation and Maintenance (OAM) configuration, local (e.g., at the access network) policies, and/or other specific parameters, such as the single network slice assistance information parameter that identifies a network slice. The parameters carried within the CP application traffic may enable the relevant AN to route messages to the correct NAS Server.

Figure 6:
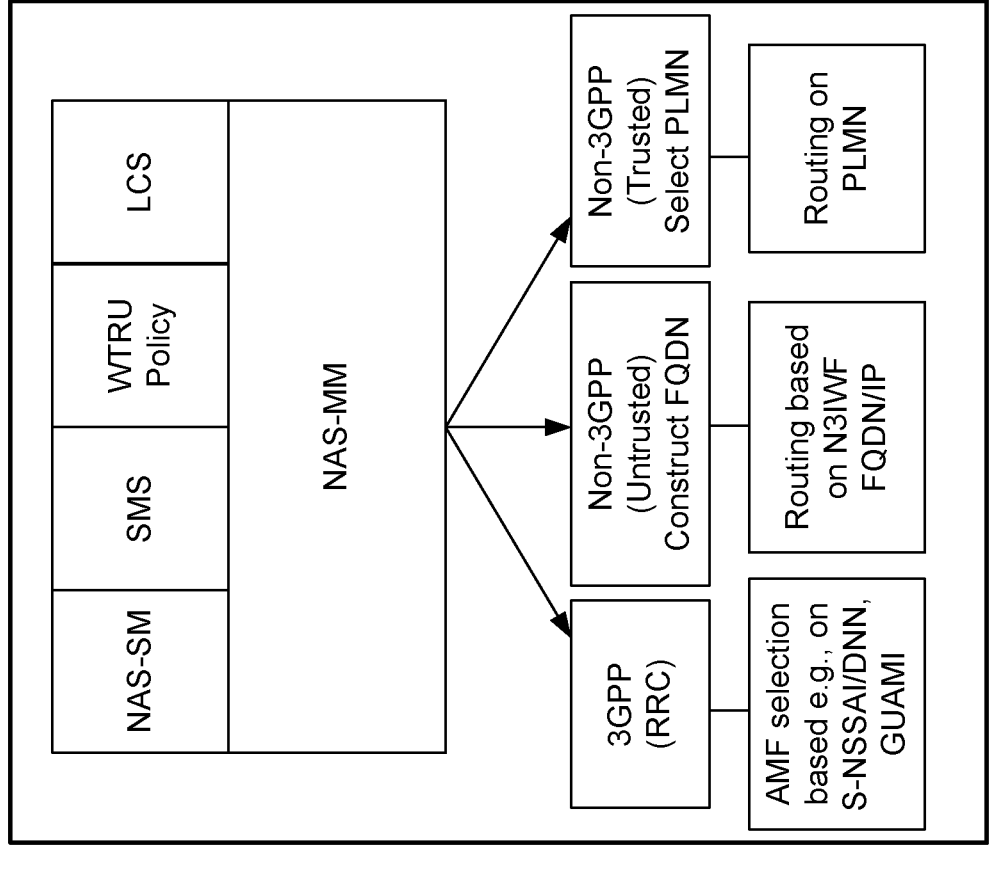
FIG. 6 is a diagram illustrating example access network (AN)-specific NAS routing mechanisms.

At the WTRU, the NAS client may have to know the characteristics of the AN through which the WTRU is accessing the MNO network. As shown in FIG. 6, the MM application in the WTRU may implement, e.g., may be required to implement, different routing mechanisms depending on the AN, and the WTRU may choose to connect to the core network. FIG. 6 shows an example of AN-specific NAS routing mechanisms.

A device (e.g., a WTRU) that is enabled with a Non-Access Stratum application or software stack and that may use an access network to establish a secure channel towards a core network server may be able to avail specific services, if the WTRU is authorized to access these services and the device is able to find the relevant server, e.g., an Access and Mobility Management Function (AMF), in much the same way as an application finds and accesses a server supporting relevant services.

Service communication proxy may be provided. Indirect communication in the Service Based Architecture (SBA) may use an SCP. The SCP may be an intermediate node between the client and the server in SBA communication. The client may be referred to as a requester and the server may be referred to as resource owner. The client may be a service consumer that sends a request to a service provider (e.g., the server), for example, which may send back a response. The client may be a service provider that sends an indication to a service consumer (e.g., the server), which may send back an acknowledgement. Functions of SCP may include one or more of the following: forwarding and/or routing traffic to destination NF/NF service (e.g., possibly through other SCP); performing discovery using a network repository function (NRF) (e.g., if delegated discovery is used); forwarding and/or routing server-initiated traffic (e.g., callbacks); and load balancing and monitoring control plane traffic.

SCP may be an HTTP intermediary node. It may terminate the transport connection, may access and/or modify the HTTP headers and body, and/or forward messages between consumer and provider. SCP may be a part, e.g., trusted part, of the operator's network infrastructure. The SCP may be an attack surface for an adversary to attack to get access to critical control traffic. This may prevent SCP nodes from being deployed in a more open and shared network (e.g., on a home gateway, etc.) WTRUs may communicate directly with SBA functions (e.g., directly with SMF using HTTP rather than over NAS signaling through AMF). In such a case, it may be useful to deploy an SCP, or equivalent function, on a WTRU (e.g., on the requesting WTRU or on a relay WTRU).

The server may send a binding indication to the client that indicates that the server may be selected in a given NF service instance, NF instance, NF service set, or NF set, for a particular uniform resource identifier (URI)/resource. The client may include the information in a routing binding indication in related requests (e.g., subsequent related requests). The SCP may use routing binding indication to route traffic.

To provide Service Based Interface (SBI) services such as delegated discovery and routing, SCP may make use of HTTP headers, which may be referred to as SBI headers herein. SBI headers fields may include one or more of the following: multiple 3gpp-Sbi-Discovery-* header fields used for delegated discovery; 3gpp-Sbi-Nrf-Uri provided by a client to assist delegated discovery; 3gpp-Sbi-Routing-Binding to enable selecting a target of the message; 3gpp-Sbi-Callback to mark the message as a callback message for a differentiated service by SCP; 3gpp-Sbi-Message-Priority to enable the SCP to apply differentiated services; 3gpp-Sbi-Max-Forward-Hops for loop avoidance; and authentication-related fields (e.g., for OAuth 2.0 scope and tokens).

An HTTP proxy used in SBA may be the Security and Edge Protection Proxy (SEPP). Like SCP, SEPP may be an intermediary HTTP node that may read plain text messages between client and server. SEPP may provide the functions of message filtering (e.g., between the domains of different mobile network operators) and/or topology hiding.

HTTP/3 proxying may be provided. A QUIC proxy may support an HTTP/3 technique extended CONNECT. An extended CONNECT, e.g., sent by a client to a proxy, may include a ": protocol" IE that indicates the protocol to use on the HTTP stream used for the CONNECT request, e.g., after the CONNECT request and response. An extended CONNECT may include an ": authority" IE that includes the authority portion of the target server URI. As described herein, the term CONNECT may designate a CONNECT or extended CONNECT.

For example, a client may send a CONNECT with a ": protocol" value "connect-udp" and an ":authority" value "server.example.com" to a proxy to establish an end-to-end proxied user datagram protocol (UDP) connection (e.g., a QUIC connection). The client may exchange, e.g., with the proxy, traffic such as UDP datagrams inside DATAGRAM frames. The client may exchange, e.g., with the proxy, UDP datagrams inside QUIC DATAGRAM capsules transported in the proxied stream. The QUIC proxy may forward the UDP datagrams to and/or from the target server over a tunnel or transport connection (e.g., a UDP connection). Capsule types may include the DATAGRAM type, for example, which provides a service equivalent to the DATAGRAM frame in cases where a node does not support it (e.g., when using HTTP/2). Capsules may be forwarded by proxies towards the remote endpoint and may be used for end-to-end communication.

Control plane communication from WTRU to 5GC may be tunneled through the AMF. The AMF may select NF to serve the WTRU based on the profile information of the NFs and may forward traffic between NFs and WTRU using parameters of the NF's profile and the Network Slice where these functions reside. The AMF may remain connected to the NFs via a signaling path, e.g., while the NFs provide services to the WTRU. This may result in one or more of the following: other services provided by these NFs may be used before the Mobility Management (MM) context is established, leading to dependency on MM service state; the AMF may be a bottleneck due to high signaling load; and the requirement to pass through the AMF prevents using additional paths, which may lead to opportunities to improve NAS service resiliency, latency, and/or throughput. Enabling WTRU-NF communication over HTTP/IP, e.g., using existing SBA mechanisms defined in mobile networks, may not result in implementation, especially in cases where indirect communication is desired (e.g., to hide network operators' topology to WTRUs).

WTRU-NF exposing network operator's topology may result in the SCP function, if deployed in third party networks (e.g., in gateways), raising security concerns as attackers may access network elements outside the operator trust zone.

Delivery of service-independent non-access stratum services may be provided. A WTRU's access to NAS services may be handicapped by its reliance on AMF as the single point of access to the core network, leading to issues such as dependence on MM service state and network congestion.

NAS may enforce a single point of access between the WTRU and the network, if interchanging system messages to enable attachment, mobility management, and/or session management procedures. The messages may go through (e.g., may always go through) a particular functional entity (e.g., the AMF) regardless of the functionality the messages are intended for, which may result in forcing (e.g., always forcing) the same communication path regardless of the network function service requested by the WTRU.

Figure 7:
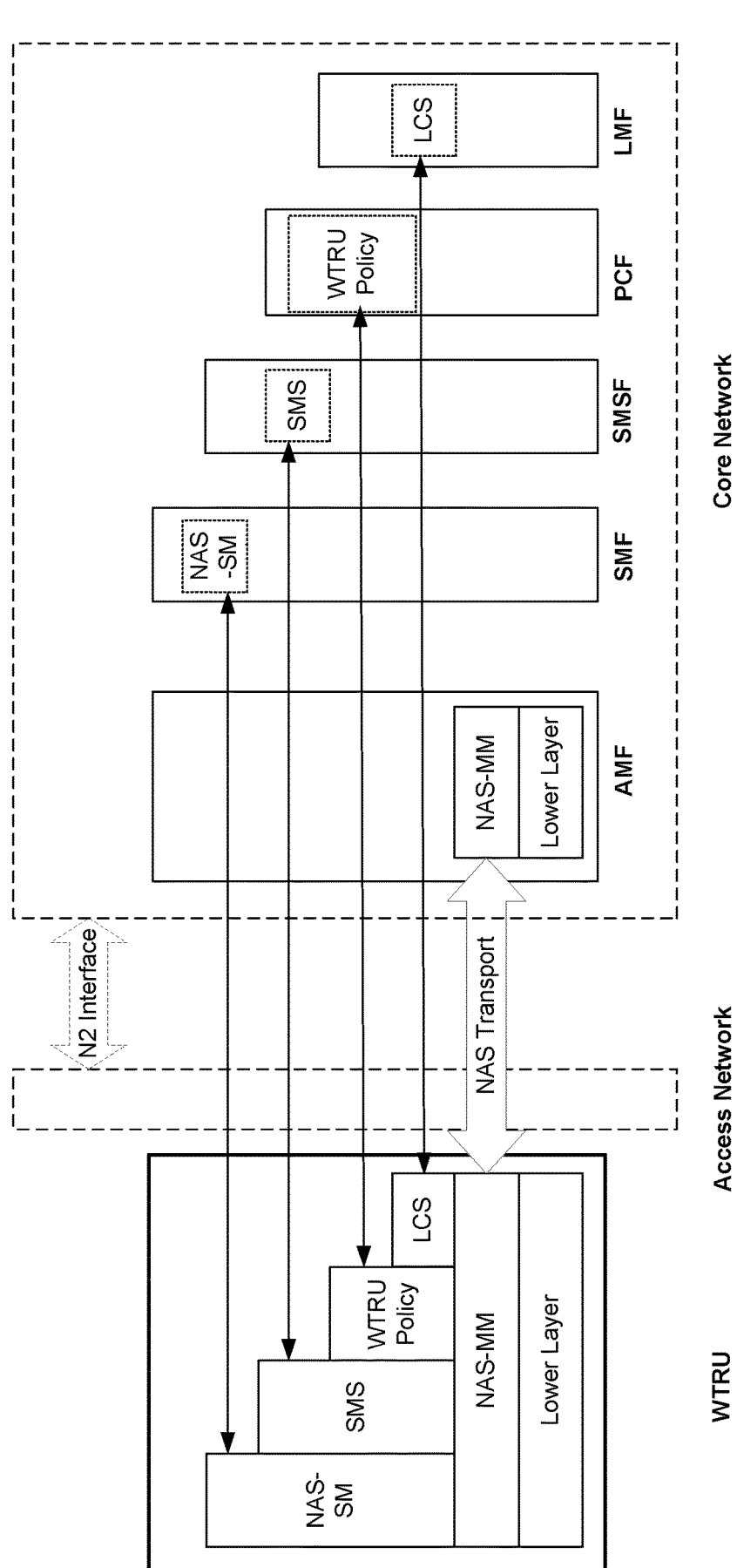
FIG. 7 is a diagram illustrating an example NAS bottleneck architecture.

Session management (SM) messages, which are used to establish network user plane connectivity, may be tunneled through a Mobility Management (MM) entity even though the SM message is intended for a different network entity which provides services that do not use the mobility management entity that is in the path of the message. The mobility management entity may be used (e.g., only used) to provide a container that holds the messages. The pattern may be repeated for other services, such as those used to provide location services, short message services, and/or policy management. As shown in FIG. 7, an example NAS bottleneck architecture may be provided.

Regardless of the requested service from the core network, NAS messages (e.g., all NAS messages) may be tunneled through the Mobility Management tunnel referred to as NAS Transport as shown in FIG. 7. The services (e.g., all the services) may be linked to the MM, e.g., since as described herein they involve the MM service to be established before the services may be delivered. The AMF may provide both Mobility Management Services and NAS message routing services to the WTRU, which is shown in FIG. 8 and FIG. 9.

This may impact the system, resulting in service state dependencies across NAS services and/or signaling load. WTRU firmware updates may involve system registrations (e.g., full system registrations) due to bringing down the session management service (e.g., PDU sessions), if the Mobility Management service is restarted (e.g., during a full registration procedure). A service offering (e.g., any other service offering) may depend on a central service (MM) to deliver its benefits, which may result in inefficiencies.

Figure 8:
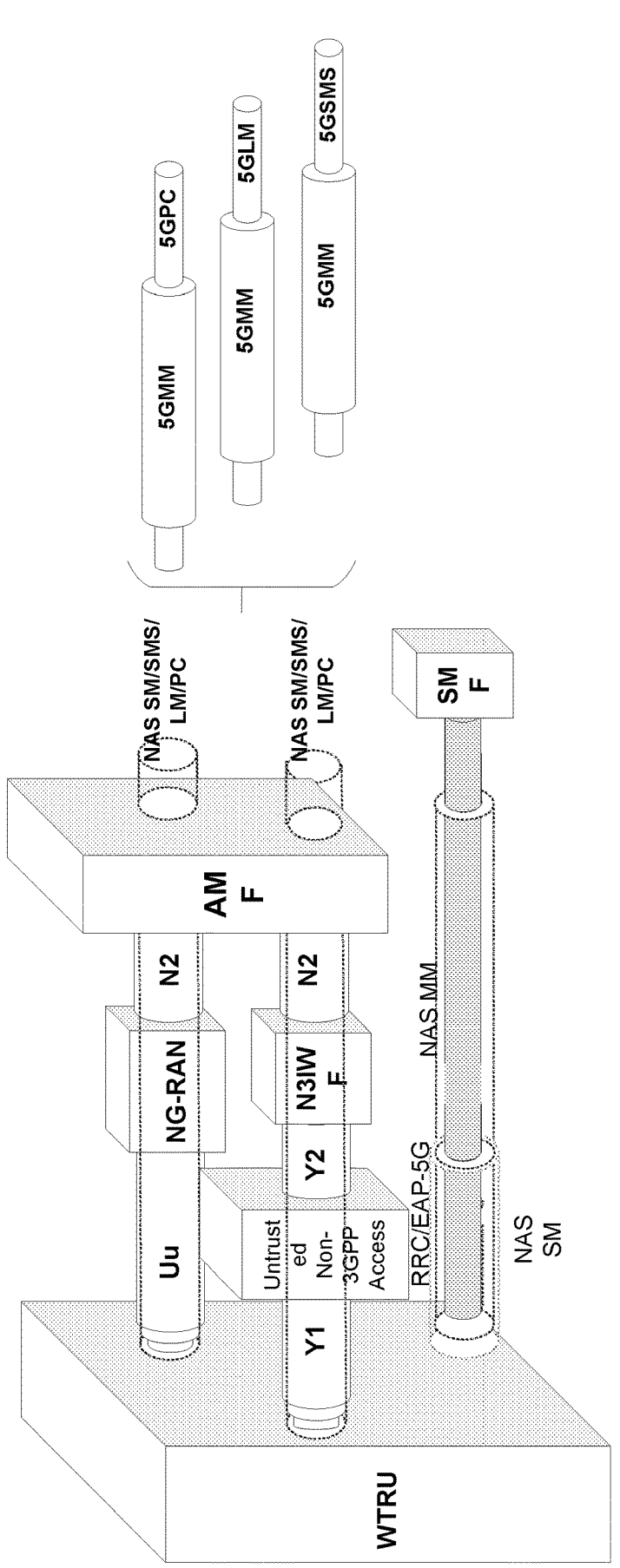
FIG. 8 is a diagram illustrating an example of core services over an NAS message tunnel.
Figure 9:
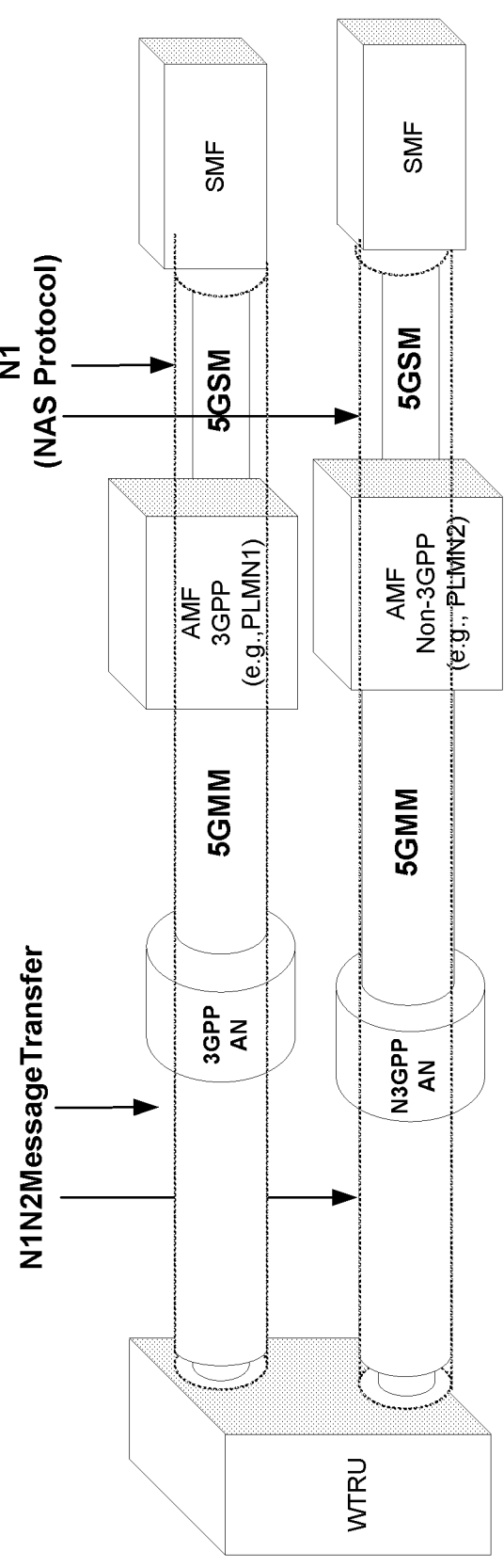
FIG. 9 is a diagram illustrating an example access specific NAS message tunnel.

FIG. 8 shows an example of core services over a single NAS message tunnel. As describe herein, e.g., unlike the current trend from the cloud and telecommunications industry, services, e.g., 3GPP services such as mobility management, session management, policy management and/or the like may not follow expose IP-based RESTful APIs/interfaces and may miss out on scalability, portability, and/or the like, since the services may, e.g., may be forced to, follow a path (e.g., specific path) through a predefined tunnel, specific to a service (e.g., the AMF), which serves as the only point of entry into the core network. This may cause other NAS services to rely on the AMF state logic, which may make them dependent on the availability of AMF services to operate.

Architectures and/or procedures may be designed to enable the WTRU to securely access network services (e.g., NAS services) without dependencies on any other specific network service, e.g., as may be the case with MM service supported by the AMF.

Enabling access independent service routing may be provided. Although the core network (5GC) may be architected to be access-independent, the NAS layer may be, may have to be, aware of what access technology is involved, for example, to reach the 5GC, as described with respect to FIG. 9. FIG. 9 shows an example of access specific NAS message tunnel.

The NAS client may have to choose a different routing mechanism depending on whether the access network is 3GPP access, trusted Non-3GPP or untrusted Non-3GPP access. Cloud native applications may not work like this, for example, expecting the application developer to factor in which network interfaces are available and choosing how messages are forwarded.

Figure 10:
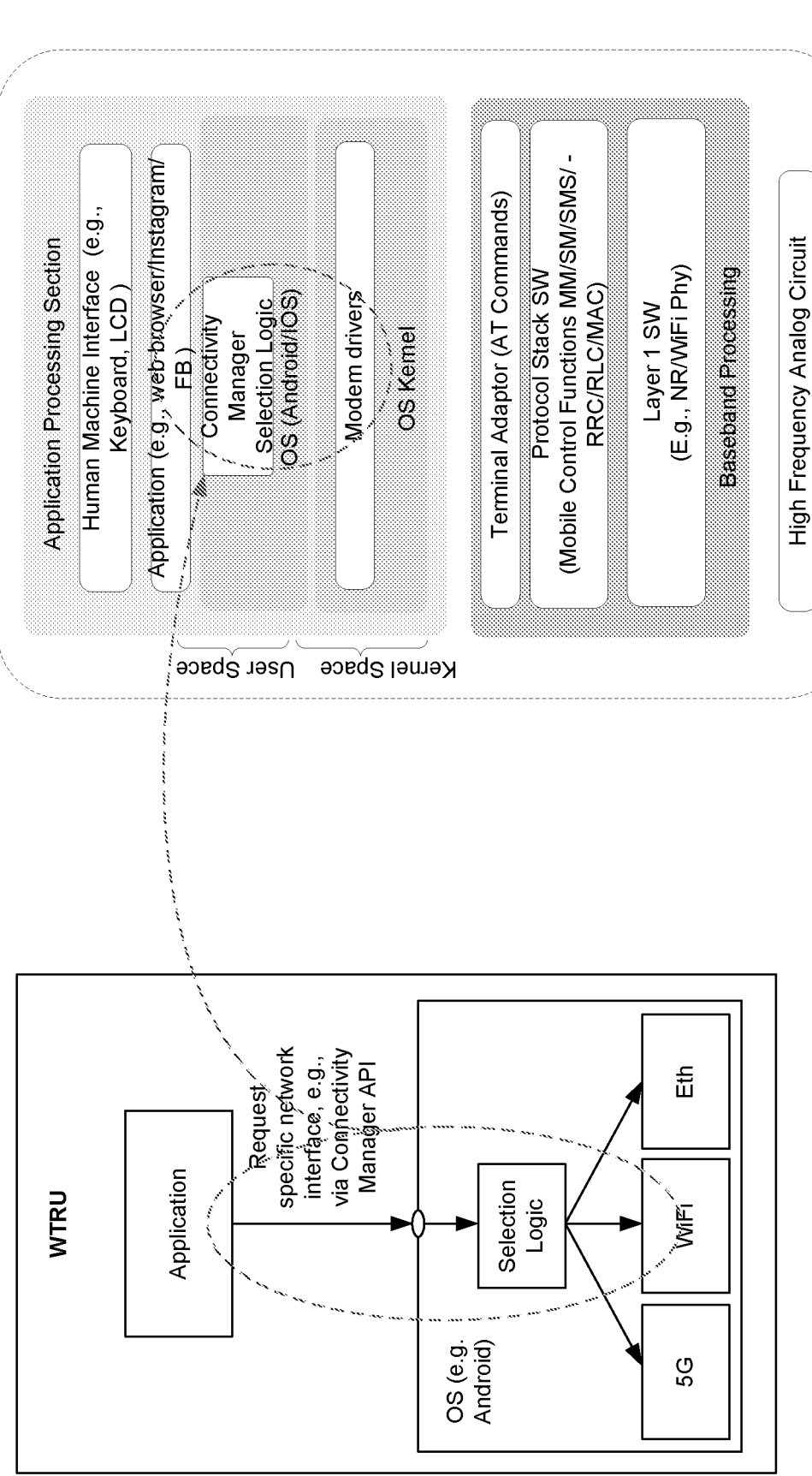
FIG. 10 is a diagram illustrating an example of per-application network interface selection.

As described with respect to FIG. 10, the applications may have logic to determine whether a network interface (e.g., representing a particular access technology) is used. For example, there may be applications (e.g., automotive applications) that involve specific messages being routed through a specific network interface, e.g., Wi-Fi or cellular, but the applications do not have to worry how to route the request to a specific server, using different security and routing mechanisms depending on the access technology such as a network interface. FIG. 10 shows an example of per-application network interface selection.

The NAS client, e.g., once the access technology is selected, may use different routing mechanisms and/or security procedures to send the relevant client request to the NAS core network server, as described herein.

Figure 11:
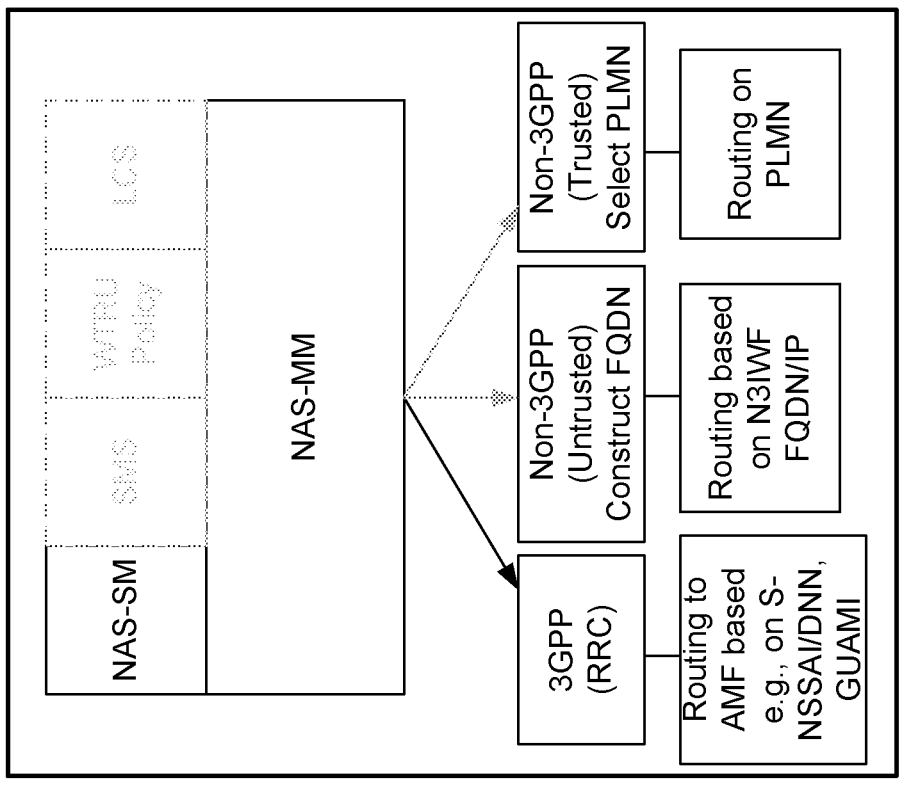
FIG. 11 is a diagram illustrating an example of a NAS client request over 3GPP access.

If the 5GC is accessed through a specific access (e.g., 3GPP specific access), as shown in FIG. 11, e.g., through a gNB supported by a NG-RAN (Next Generation Radio Access Network), the NAS client may pass the NAS client request message on to the lower layer, e.g., which in the case of 3GPP Access corresponds to the radio resource control (RRC) layer.

The access node (e.g., 3GPP access node) may deliver (e.g., route) the NAS client request to an AMF (e.g., a predefined core network entity or server referred to as access and mobility management function) through a hardwired mechanism whereby the AMF is selected by the 3GPP access node based on information that is in the RRC part of the WTRU's request or based on information that was included in a previous RRC message from the WTRU. For example, the 3GPP Access node may have selected the AMF to serve the WTRU based on a Globally Unique AMF Identifier (GUAMI) and/or NSSAI that was provided by the WTRU in an RRC message. FIG. 11 shows an example of an NAS client request over 3GPP access.

Figure 12:
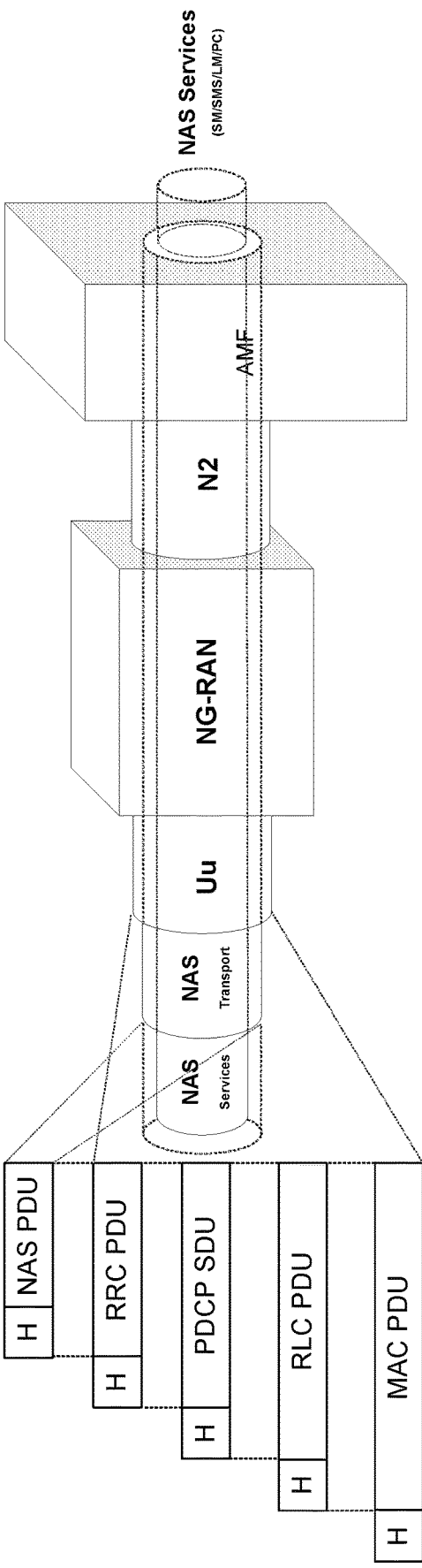
FIG. 12 is a diagram illustrating an example of routing over an access network, which may be a 3GPP-based access network.

As shown in FIG. 12, the NAS SDU may be placed in the RRC PDU to be sent over the Uu Interface to the NG-RAN, for example, which may route the message to a predefined access and mobility management server. FIG. 12 shows an example of routing over an access network, which may be a 3GPP-based access network.

Figure 13:
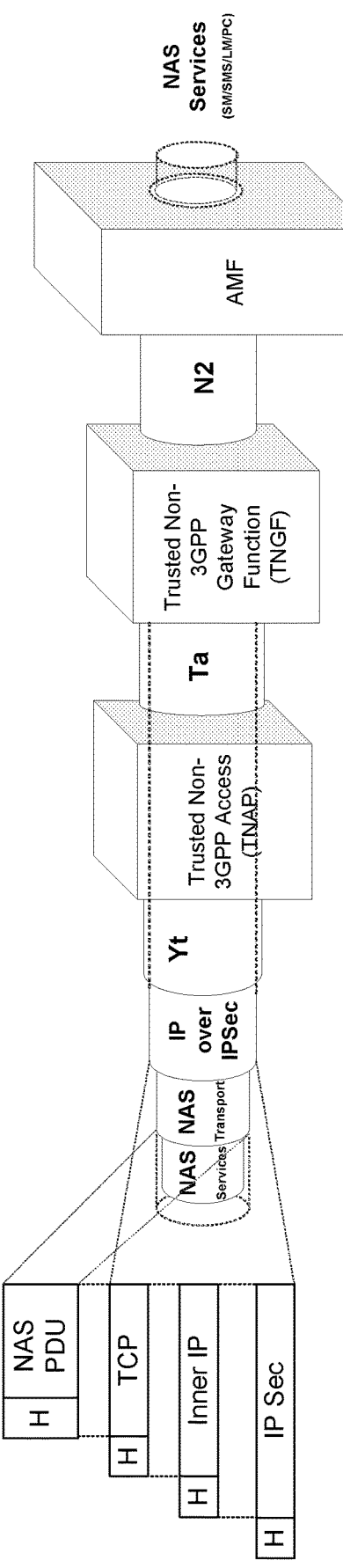
FIG. 13 is a diagram illustrating an example of routing over a trusted access, which may be a trusted non-3GPP access.

FIG. 13 shows an example of routing over a trusted access, which may be a trusted non-3GPP access. As shown in FIG. 13, the WTRU may use this process to send NAS client messages to an NAS server if the access is a trusted non-3GPP access.

The procedure whereby the NAS client sends a message request may be unscalable and may not operate under the RESTful principles.

An architecture and/or procedures may be designed that use RESTful realizations across control plane components (e.g., all control plane components) enabling NAS clients to utilize the same service-centric methodology to communicate with another NF (e.g., any other 5G NF) in the network (e.g., 3GPP networks), regardless of the access technology.

The network may encompass aspects (e.g., all aspects) of the cellular/mobile system, e.g., which may be referred to as a 3GPP System, which may include access nodes (e.g., RAN and non-3GPP access nodes) and the WTRU. As a result, a NF may reside anywhere in the system (e.g., 3GPP system) and service-based concepts may apply (e.g., apply equally) to components (e.g., any component) of the system (e.g., 3GPP system).

Enabling secure indirect access to NFs from a WTRU. As described herein, applying service-based architecture techniques to NAS communication may help address its current reliance on AMF. In this framework, WTRU-NF communication may be direct or indirect. Indirect communication may simplify a clients' implementation and hide network service topology. Indirect communication, e.g., in 5G systems, may use intermediate nodes defined as SCP. SCPs may be HTTP intermediaries that terminate the HTTP connection and may access plain text messages between a WTRU and NFs, which may be vulnerable to a man-in-the-middle attack scenario where an attacker may replace an SCP instance with a malicious software program. The malicious SCP software program may operate as usual, except that it may access control traffic content (e.g., all control traffic content) and may store it, send it to an attacker system, or selectively attack a user. In the case where SCP is deployed (e.g., only deployed) in secure data centers, e.g., along with other core network NFs, this type of attack may be prevented through physical security of the data centers.

In a context where WTRUs communicate with NFs over HTTP, intermediate SCP nodes placed close to WTRUs, e.g., in residential, industrial or IoT gateways, or collocated with WTRUs, may be useful to select (e.g., efficiently select) remote NFs and route control traffic, e.g., in much the same way as 3GPP 5G CN does. If an SCP is deployed in a local network or a WTRU, physical security may not be enforceable in the same way as when SCP is deployed in a datacenter, which may lead to a higher likelihood of an SCP being compromised.

This may apply to SEPP, e.g., in situations where SEPP may have to be placed in a distributed fashion between local domains.

To protect the system against the man-in-the-middle attack described herein, an SCP may be redesigned for higher security as a secure SCP (SSCP), which may not have access to the message clear text (e.g., body and header).

Since SSCP does not have access to clear text end-to-end, existing SCP-based procedures for indirect service-based control plane may not be applied directly to SSCP. SSCP may not obtain nor set the information (e.g., SBI headers) present in the end-to-end control messages HTTP headers.

One or more of the following characteristics may address the situations described herein: a more decentralized access to NAS services, which may be independent from MM service state; NAS applications in the WTRUs may be able to access NFs directly (e.g., over IP) as opposed to having to go through an AMF; WTRUs may be able to access an NF through multiple paths; WTRUs, e.g., if connected to multiple ANs, may communicate with stateless NFs (e.g., multiple instances of the same NF) to be used simultaneously or sequentially; the WTRU-NF and WTRU-WTRU communication may be secured end-to-end; the operator network topology may be protected from the WTRU; and the NAS message may be transported over any medium and available path, including IP over AMF, non-3GPP UP, and/or 3GPP UP RAN.

To enable the characteristics, an architecture may enable NAS messages to operate at the application layer instead of inside the modem and mechanisms and procedures may enable services to run independently from one another, which may be achieved by decoupling mobility/location update and access functionality from network connectivity or session management.

Network operator services NFs (e.g., NAS 5G core services) may be accessed by the WTRU directly using HTTP over IP, over a distributed and multi-access infrastructure.

Network operator service communication may be enabled by a WTRU communication proxy (UCP) function in the WTRU, which may implement functions such as NF discovery, message routing, traffic monitoring, and/or load balancing. The UCP may include functionality that hides access network discovery and access network availability, as well as internal routing of access stratum messages (e.g., 3GPP specific access stratum messages) to enable NAS applications to access the RRC layer, for example, if the access network is a 3GPP Access Network.

A WTRU may access NFs using either a direct or indirect technique. In the direct technique, the WTRU may obtain the NF FQDN (e.g., by communicating with NRF) and may establish an HTTP session with NF (e.g., using HTTP/2 or HTTP/3). In the indirect technique, the WTRU may obtain the address of an SCP proxy described herein and may establish communication with the NF through this SCP proxy. The SCP proxy may implement functions such as delegated discovery, message routing, traffic monitoring, load balancing, topology hiding, and/or enhanced communication security (e.g., through coalescing WTRU-NFs traffic). SCP proxying may be performed as an HTTP intermediary (e.g., with access to plain text traffic) or as a secure proxy (e.g., that forwards encrypted end-to-end traffic between consumers and producers), as described herein.

In an indirect technique, the WTRU may use (e.g., may only use) a universally standardized name for identifying the target NF without using a fully qualified domain name. The UCP may offer a translation from plain NF type names, e.g., smf, nef or nrf, into either IP addresses or FQDNs, following the techniques disclosed herein. The mapping with the UCP may be pre-configured based on URSP rules or programmatically pushed into the UCP via an Application Programming Interface (API).

Local policy (e.g., URSP rules) may be used to control, by the network operator, the access technique(s) available to the WTRU (e.g., direct or indirect), as well as associated parameters such as SCP proxy FQDN or other ID.

In the indirect communication, WTRU-proxy communication may be based on a number of client-proxy protocols, such as HTTP using the HTTP CONNECT technique as described herein. Similar WTRU-proxy communication protocols may be adapted from the protocol described herein to communicate with network operator services over layer-2 communication (e.g., NAS protocol). As a result, a WTRU may communicate with network operator services, simultaneously or successively, communicating through proxies using protocol based on different underlying client-proxy protocols.

Based on enabling the characteristics described herein, one or more of the following may apply. Aspects of WTRU-NF communication techniques may include: direct WTRU-NF communication that enables efficiently using distributed NFs (e.g., microservice functions); indirect WTRU-NF communication that enables hiding the operator's network topology on the WTRU-SCP path; secure indirect WTRU-NF (e.g., indirect technique using encrypted end-to-end communication) that enables deploying SCPs in less secure facilities, e.g., outside the operator's core network; techniques may be complementary and may be supported concurrently on the same WTRU; and direct and indirect WTRU-NF communication over HTTP/IP (e.g., HTTP/2 over TLS/TCP/IP or HTTP/3 over QUIC/UDP/IP) that enables communicating through, e.g., IP, transport networks such as transit networks, data networks (DN), non-public networks (NPN), local area data networks (LADN), home networks, enterprise networks, the Internet, or private networks. The IP/transport networks may host NFs.

Figure 14:
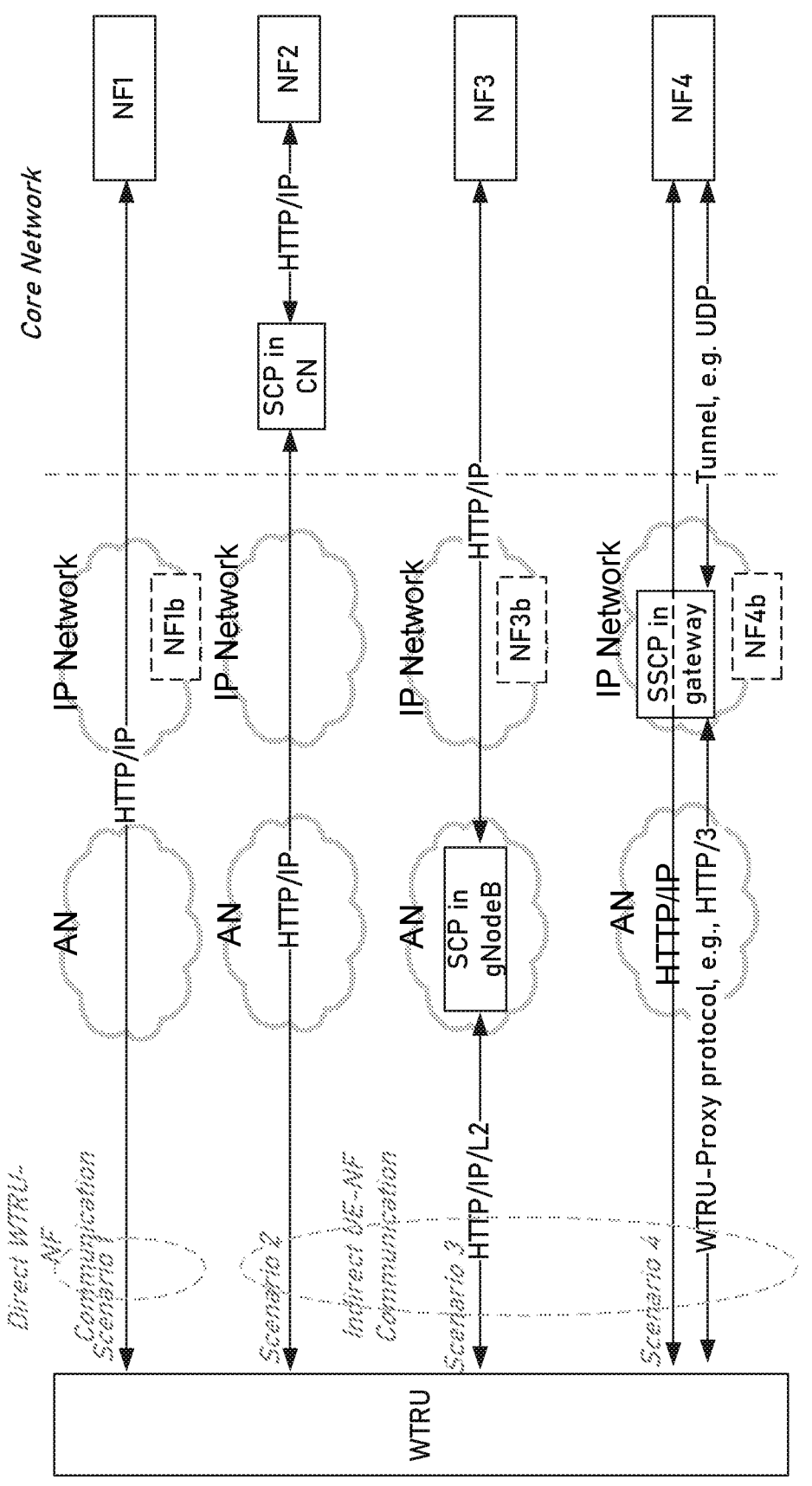
FIG. 14 is a diagram illustrating an example of direct and indirect WTRU to network function (NF) communication.

As shown in FIG. 14, an example of direct and indirect WTRU-NF communication may be provided. Since the WTRU-NF communication may be carried over HTTP/IP, it may cross zero and one or more IP/transport networks before packets from the WTRU may reach the NF. Over the access network (AN such as RAN), WTRU-NF communication may be carried over an, e.g., IP, PDU session, and/or a tunnel (e.g., L2 tunnel using NAS protocol or HTTP tunnel using the CONNECT technique). As shown in FIG. 14, scenario 1 shows direct WTRU-NF communication between the WTRU and NF1. As shown in FIG. 14, other scenarios show indirect WTRU-NF communication, for example, using an SCP in CN (e.g., scenario 2), an SCP collocated, e.g., with a UPF, in a gNodeB (e.g., scenario 3), and an SSCP collocated with a, e.g., home, personal or enterprise network gateway (e.g., scenario 4). In examples, a WTRU may communicate with NF1b/NF3b/NF4b located in IP/transport networks or on other WTRUs. FIG. 14 shows an example of direct and indirect WTRU-NF communication.

Figure 15:
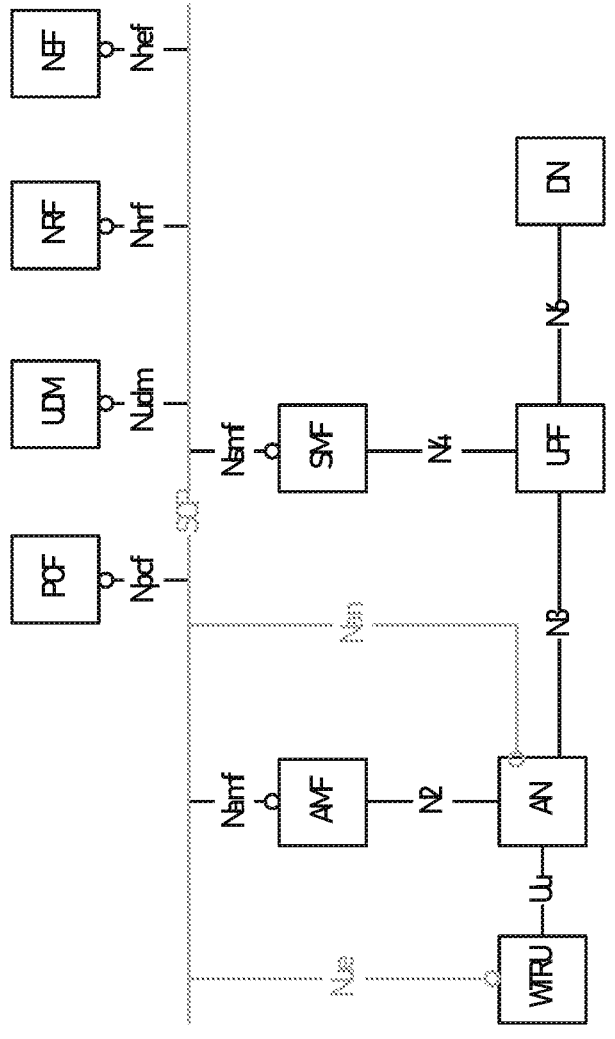
FIG. 15 is a diagram illustrating an example system architecture.

A system architecture may be provided. The techniques described herein may be associated with a system architecture, as shown in FIG. 15. The changes may be depicted in blue and introduce a change from N1 to Nue to extend the SBA on the control plane, for example, which may include the WTRU for NAS signaling via HTTP. As illustrated, the WTRU may offer an SBI for receiving notifications and/or for allowing CNs (e.g., 5GC CNs) to communicate with the WTRU as consumers. FIG. 15 shows an example of a system architecture.

As a direct consequence, the WTRU may utilize the UCP to reach any 5GC NF and vice versa. Note, that non-NAS-related communication on N2 between the AN and the AMF remains untouched, therefore, N2 is still present and based on whether the WTRU has an HTTP-based NAS message to be sent, the AN may act as a network router or even bridge, based on its configurations.

Figure 16:
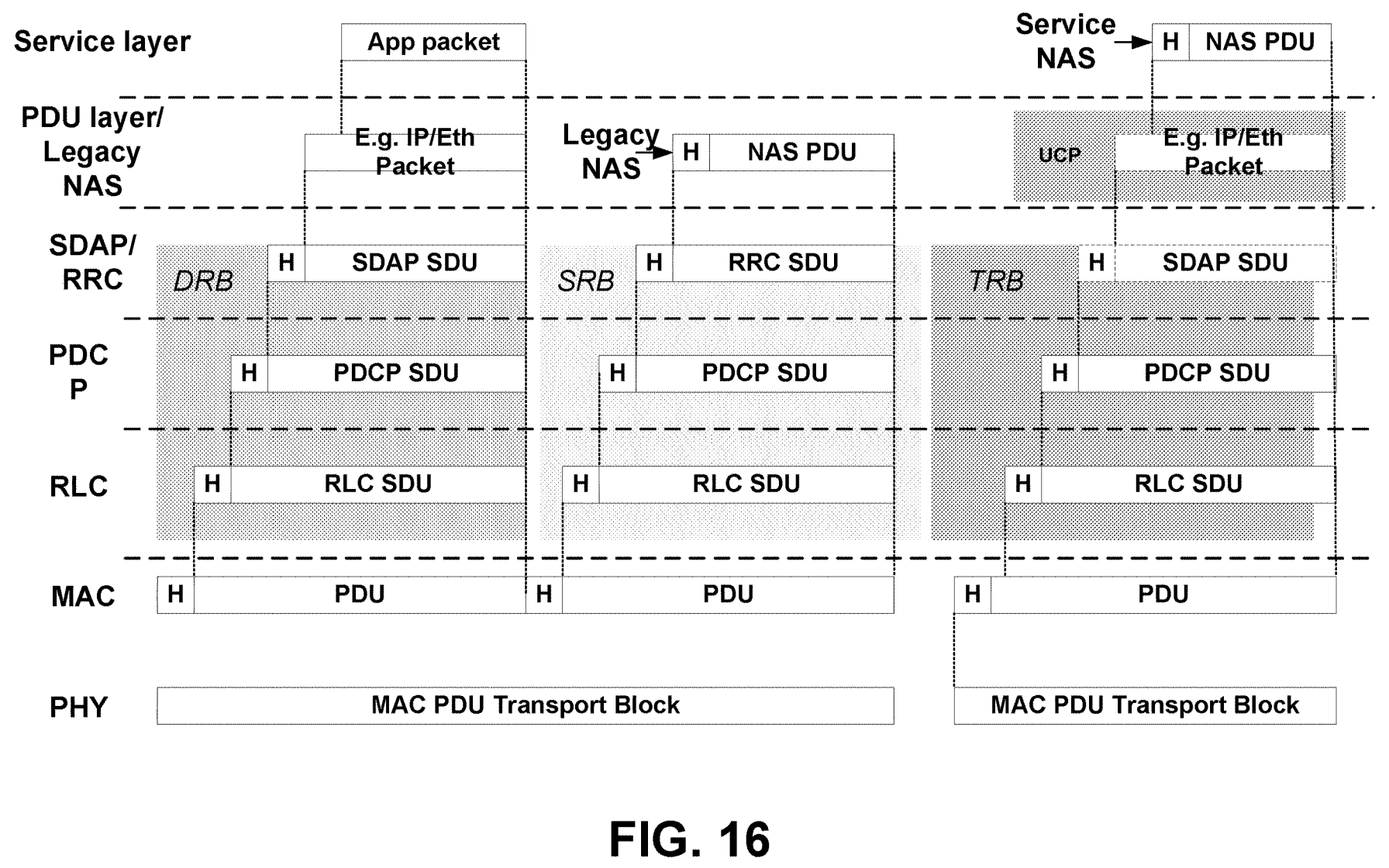

The NAS service layer described herein may be enabled to operate as "Legacy NAS" or "Service NAS." The legacy NAS may provide the same functionality as the current NAS layer and a non-NAS Service enabled 3GPP access network stack may not see a difference. If a service-enabled 3GPP AN stack is present, it may distinguish between the two NAS entities. For this, a radio bearer, referred to as transparent radio bearer (TRB), may be used to carry service NAS layer messages, or another message (e.g., any other message) that may be transparently sent to a CN entity (e.g., 3GPP CN entity). This may enable the gNB to determine if the Service NAS message may be transparently sent to the core network. Transparent operation may be used, for example, if the UCP implements functionality that is provided (e.g., currently provided) by lower layers (e.g., Packet Data Convergence Protocol (PDCP)). Ciphering and integrity protection of service NAS messages may be conducted in the UCP. The UCP may include a flag in the message header sent to the AN stack (e.g., 3GPP AN stack) to indicate the transparent mode. A secure SCP entity or equivalent functionality may be housed in the gNB to enable this functionality across the Uu interface. This may be shown in FIG. 16. FIG. 16 illustrates an example of data flow at the Access Stratum showing TRB. To support the different models of direct and indirect communication, the availability of an SCP as shown FIG. 17 may be optional.

Figure 17:
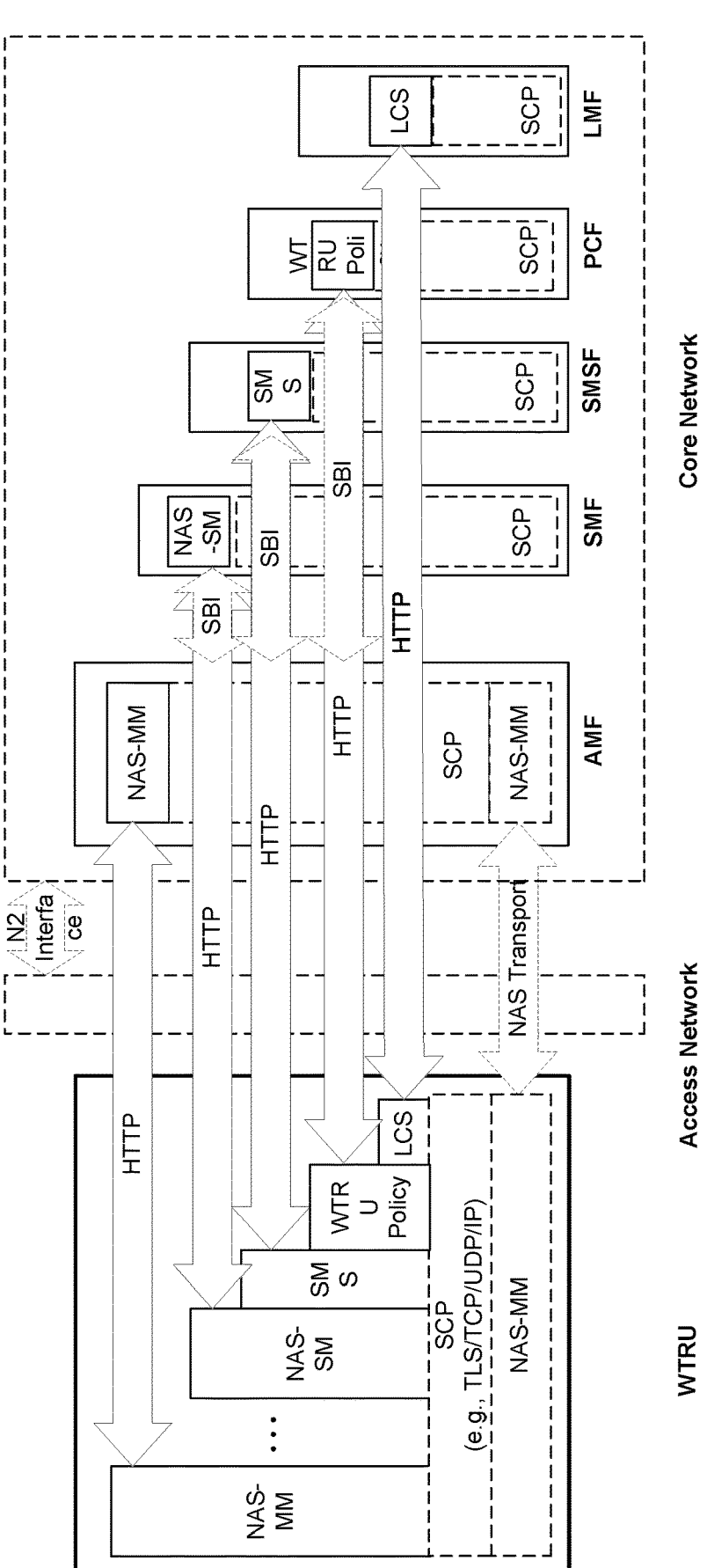
FIG. 17 is a diagram illustrating example of independent services.

A service independent system (e.g., 3GPP system) may be provided. FIG. 17 shows an example of service independent 3GPP services. As shown in FIG. 17, a paradigm in systems (e.g., 3GPP systems) may be used for enabling independent access to services and functions (e.g., 3GPP services and functions). This may mean that a service (any 3GPP service such as system authorization, system access and/or data connectivity) may be requested independently from other services. Service independence in this context may be the possibility for a service to be delivered without degradation caused by another service. Service independence may mean how a service is delivered may not be a constraint to the shortcomings of another service.

Service independence may mean that applications do not have to know the access network (e.g., specific access network) used by the platform to access core network services, e.g., unless this knowledge is essential to the logic of the service supported by the application. In examples, the application may not have to handle routing and forwarding towards such access networks. As a result, as shown in FIG. 17, a terminal side service communication proxy function may be enabled in the WTRU to take care of messages (e.g., all messages) generated by non-Access stratum (NAS) applications that have to access services provided by a network peer (e.g., services currently provided by network entities such as the AMF or SMF).

The client-side service communication proxy SCP, which may be referred to as UCP, may be responsible for routing NAS messages over available access networks supported by underlying network interfaces. The UCP may not execute NAS specific logic, but rather the UCP may execute logic that enables secure forwarding and routing of NAS messages over available medium (e.g., any available medium). The UCP may provide an access network proxy service, e.g., in the form of an NF (e.g., network function or microservice that enables NAS applications to receive notification about access network availability and key characteristics as well as allowing NFs (e.g., 5GC NFs) to act as consumers towards the WTRU which may act as a producer). The SCP (e.g., current SCP) may not be considered as an NF and may not be handled as a service producer. The UCP may be considered as an NF, e.g., with additional logic beyond proxying communication from the NAS service layer. For example, an NAS application handling PLMN selection may subscribe to 3GPP AN events, for example, to retrieve system information services. The same application may subscribe to Wi-Fi-based ANs events to retrieve trusted WLANs advertising a PLMN (e.g., specific PLMN). The WLANs may advertise information about the PLMNs they interwork with. The UCP may retrieve the information, e.g., by using the ANQP protocol.

The UCP may detect available network interfaces (e.g., using OS calls or accessing applicable device drivers) and may route NAS messages from NAS applications that may use one or more specific access networks (ANs). The detection of interfaces and possible routes towards NFs may involve a multi-domain bootstrapping and routing capabilities within the UCP to operate over access networks (e.g., 3GPP and non-3GPP access networks). A WTRU high-level SW architecture is shown in FIG. 18. FIG. 18 illustrates an example of service independent high-level SW architecture.

The UCP may forward NAS messages over secure paths towards an SCP or SCPs managing message forwarding and routing for the NF(s) that the WTRU may have to contact to deliver a service or the NF(s) themselves, as shown in FIG. 19. FIG. 19 illustrates an example of secure NAS communication over SCPs.

The UCP may discover and select relevant SCPs (e.g., or NFs) in the network using at least one or more of several techniques In a first example technique, the WTRU and/or UCP may be locally configured by the network Operator with endpoint addresses (e.g., FQDNs or URIs) of the SCPs to be used to establish a secure communication towards relevant NF; or it may be configured with endpoint addressed of the NF (e.g., without going through an SCP); this may also include the NF communication techniques, e.g., direct or indirect, and related parameters. The WTRU may be provisioned with the information through operator policy such as WTRU route selection policy (URSP) rules, as described herein. The SCP identities may be provided to the WTRU, by the network, when the WTRU receives a registration accept message from the network. The registration accept message may provide a single SCP identity to the WTRU that the WTRU may use to communicate with NFs such as SMFs, SMSFs, PCFs, etc. The network (e.g., the AMF) may use the WTRU's allowed slices (e.g., the allowed NSSAI) to determine what SCP identity to provide to the WTRU. The WTRU may receive multiple SCP identities from the network, and the WTRU may receive an indication that one or more of these SCP identities are associated with particular slices (e.g., S-NSSAIs (single-network slide selection assistance information)). The WTRU may send messages that are associated with a particular slice (e.g., S-NSSAI) to the corresponding SCP. For example, session management signaling that has to be sent to an SMF that is associated with slice-x may be sent to an SCP that is associated with slice-x. The format of the SCP identities may be an IP address, FQDN, URI, etc.

The WTRU may have to determine what slice to use to communicate with an SCP. The WTRU may use a PDU session to communicate with an SCP and the WTRU may determine what slice identifier (e.g., S-NSSAI) to provide to the network when establishing the PDU session. When establishing a PDU that may be used to communicate with an SCP, the WTRU may determine to provide the same S-NSSAI that the network indicated is associated with the SCP in a registration accept message. The WTRU may provide no S-NSSAI in the PDU session establishment request message and may indicate in the PDU session establishment request that the PDU session may be used to communicate with an SCP. The network may use this indication to determine to select a slice that hosts SCP's for the WTRU.

The UCP may discover and select relevant SCPs (e.g., or NFs) in the network using at one or more of the following. The WTRU/UCP may be configured by the network operator, e.g., through local configuration and/or operator policy provisioning, with endpoint addresses (e.g., FQDNs or URIs) of the NRF(s) to be used to discover and select the SCP or NF. The UCP may use this NRF to discover and select available SCP in the network, leading to relevant NFs or the NFs themselves. The UCP may choose different NRFs based on the service the WTRU uses. For example, different NRFs may be selected if the WTRU uses access and registration services or network connectivity services, and this may be derived by the UCP based on the NF service profile for a particular service. The UCP may choose different NRF(s) based on location (e.g., based on allowed or not-allowed Area, access network, PLMN Id, and/or CAG ID), for example, if using a public network integrated-Non-Public Network. In examples, the WTRU/UCP may obtain an SCP FQDN/URI from configuration or local policy and may request the SCP to perform delegated discovery of NF. In such a case, WTRU/UCP may not have to communicate to NRF prior to communicating with SCP. In the techniques and procedures described herein, the SCP/NF addresses may be designated as "FQDNs," and other addressing techniques may be used such as URI or IP address. Using URI may provide information such as communication protocol and HTTP resource path, which may enable supporting multiple NF access techniques. URIs may be considered a preferred addressing scheme in systems supporting multiple WTRU-NF access techniques.

The UCP may use AI/ML mechanisms, e.g., by contacting the NWDAF directly or by using a local AI/ML analytics generated using information collected from the NWDAF, to infer the correct NRF to contact when requesting SCP/NF routing and forwarding information.

An SCP may be used to enable indirect communication between WTRU and NFx. The SCP may be implemented as an HTTP intermediary or as a SSCP, as described herein. The SCP may be standalone or collocated with an NF (e.g., NFx, AMF, etc.) or network entity such as an access network (e.g., a gNB) and/or a gateway (e.g., home gateway, industrial gateway, gNodeB, N3IWF, etc.). The SCP may implement SBA functions such as delegated discovery, routing binding, differentiated service, loop avoidance, and/or authentication. The SCP may enable indirect SBA in one or more deployments, while in other deployments the WTRU may communicate with NFx directly (e.g., direct SBA).

Figure 20:
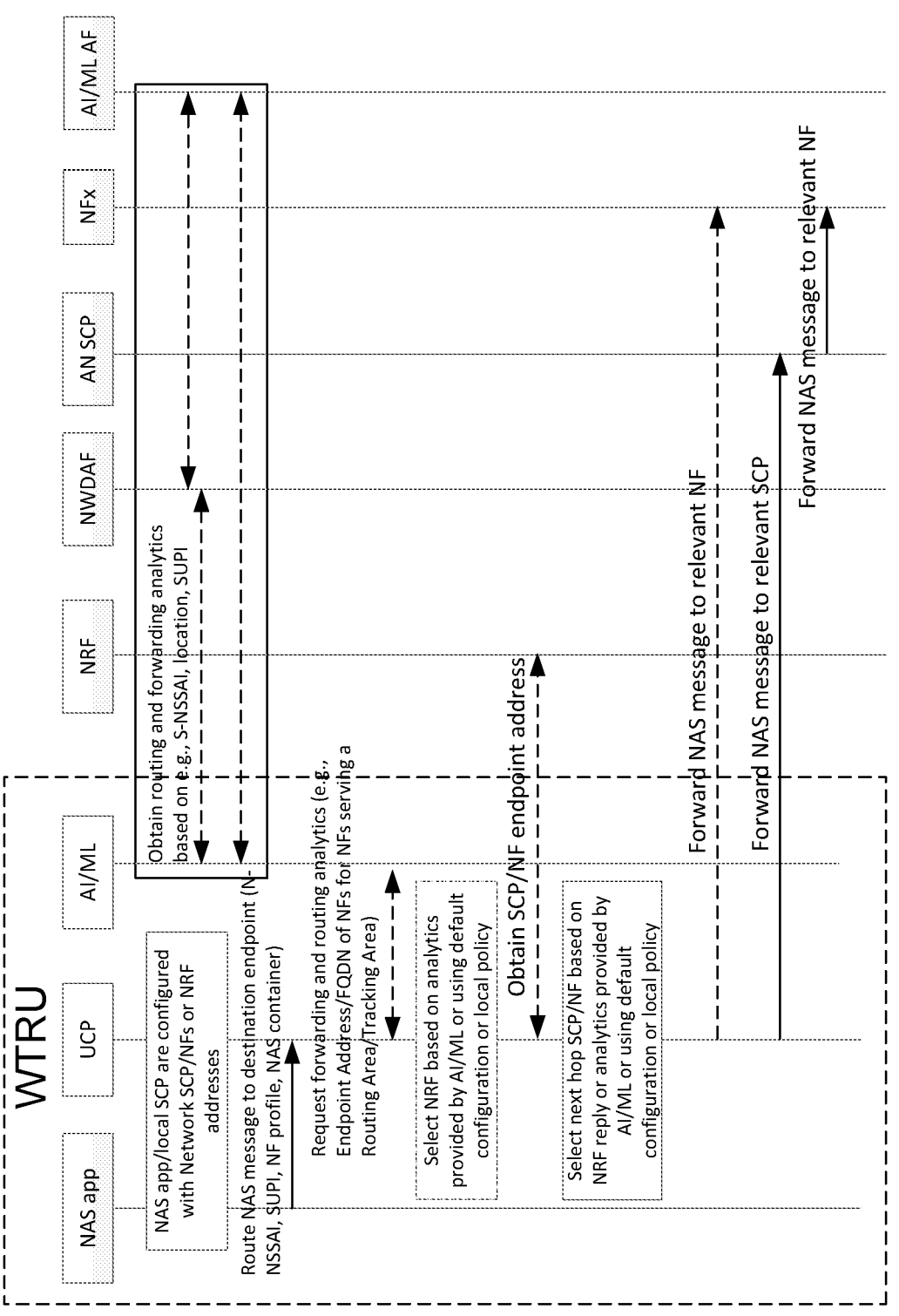
FIG. 20 is a diagram illustrating an example of user equipment (UE) communication proxy (UCP) forwarding of one or more NAS messages.

FIG. 20 shows an example of UCP forwarding of NAS messages. As shown in FIG. 20, during the startup phase, NAS applications and the UCP may be configured with relevant network SCPs/NFs and/or NRF addresses/FQDNs, e.g., using default configuration and/or local policy such as URSP rules or information that is received in a registration accept message or WTRU configuration update message. During this step, the UCP may provide NAS applications with availability and status of network interfaces. A WTRU component, at the application layer or as part of the OS kernel, may, for example, execute AI/ML operations and may obtain routing and forwarding analytics based on used network slices for a particular NAS service profile and location.

The NAS application may place messages in the HTTP frame and may forward it to the network via the UCP. The UCP may obtain forwarding and routing analytics information from the NWDAF, through the AI/ML engine, to derive endpoint addresses for suitable SCPs and NFs elsewhere in the network. The information may be obtained directly from the NWDAF using SBI interfaces exposed by the NWDAF or through an AI/ML application server/application function.

The UCP may determine the NF access method(s) using analytics data provided by AI/ML, default configuration, and/or local policy (e.g., URSP rules as described herein). One or more of the following may be executed when determined as described herein (e.g., when the selected NF communication is direct). The UCP may select an NRF based on a mechanism (e.g., any of the mechanisms) described herein (e.g., locally configured through analytics and/or through local policy). The UCP may contact the selected NRF to obtain NF/SCP endpoint addresses. The WTRU (e.g., using the UCP) may communicate (e.g., communicate first) with NSSF to obtain the NRF address. NSSF FQDN may be obtained, e.g., from local configuration.

The UCP may select a hop (e.g., next hop) SCP/NF based on NRF reply, analytics provided by AI/ML, default configuration, and/or local policy.

One or more of the following may be executed when determined as described herein (e.g., when the selected NF communication method is direct). The UCP may forward the message directly to an NF.

The UCP may forward the message to an SCP within the network (e.g., SCP). The SCP may forward the message to the correct NF.

Techniques described herein may enable independent NAS service access over any medium capable of transporting HTTP messages. The service independence may not preclude NAS specific logic to use constraints from one service when making use of another one. For example, the system registration and access authorization may be used to allow delivery of other services (e.g., data connectivity services) and it may be possible for existing, valid connections to remain connected even when the registration service may be down.

If a service that provides data connectivity is chosen, as long as the service consumer is authorized to use such service, data connectivity may remain functional even when other services such as location update or system registration may be temporarily down or be temporary out-of-order. For example, a service consumer may pay for 1 hour of internet access and a subscription server may allow the user to get internet access that goes down temporarily. The user may continue enjoying the service it paid for, regardless of whether or not the subscription service is down. No new subscribers may be allowed while the subscription services are down, but existing subscribers with active connections may not be penalized.

As described with respect to FIG. 17, a WTRU that wants to request data connectivity may request (e.g., first request) authorization to gain access to the system and may request services (e.g., additional services) such as mobility and reachability. To do this, the WTRU may avail itself of the access and mobility management functions which provide these services (e.g., all of these services). The services may be provided independently, e.g., as microservices. For example, if only access authorization is used and not reachability or mobility, the user may request access authorization. This may be used in a constrained device that is stationary and occasionally uses data connectivity, e.g., to deliver sensor information.

If the user is authorized to access services in the system, the user may request data connectivity using services provided by the session management function. The services may vary based on the uses of the user. For example, a user may request connectivity for mobile terminated services (e.g., only mobile terminated services). The user may request data delivery over NAS transport (e.g., currently referred to as control plane data delivery). In examples, if the user uses data delivery over an access network (e.g., specific access network), the user may request it and the interface toward the local UCP may provide this possibility. To transfer NAS application data over an access network, the UCP may secure the communication channel over a secured SCP to SCP or SCP to NF connection, which may be described herein.

Using URSP rules for local policy control of NF access techniques may be provided. URSP rules may in one or more techniques be used by the network operator to configure the allowed and/or preferred techniques for accessing NFs. The WTRU may obtain URSP rules from the network (e.g., 5G network) through policy provisioning techniques. URSP rules may include control plane URSP rules that include information elements, as described with respect to FIG. 21, where the traffic descriptor component IEs may be used as input to select a rule and where route selection descriptors IEs may be used by the WTRU to determine how to establish communication and where IEs (e.g., not explicitly described herein) may be URSP IEs. While URSP rules may be used to establish user-plane communication, IEs and procedure steps may be described where URSP rules are used by the WTRU (e.g., by UCP on the WTRU) to determine the techniques and associated parameters to establish control plane communication with NFs. This may include setting up PDU sessions using parameters specified in the selected URSP rule route selection descriptor, as well as determining the NF access technique (e.g., direct/indirect and parameters) and address of a proxy or NF. FIG. 21 shows an example of a control-Plane WTRU route selection policy rule.

The URSP IEs enabling the use of URSP for CP may include one or more of the following information. The information elements may include a NAS application ID. The ID of a NAS client application may be on the WTRU, which may be the client of an NF (e.g., 3GPP NF). For example, this may include an SCP client, NSSF client, NRF client, SMF client, PCF client, etc. NAS application ID may be used to determine which CP URSP rule to select for a given use by the WTRU. For example, the WTRU may select a URSP entry for NSSF to determine how to communicate with NSSF, the WTRU may select a URSP entry for NRF, and the WTRU may select a URSP entry for the NF such as SMF. NAS application ID may be encoded as an application descriptor and stored in the application descriptor information element. In one or more deployments, CP URSP rules may omit NAS application ID and set the domain descriptors IE to include FQDNs of one or more NFs (e.g., a domain such as nf.3gpp.operator-name.com that includes PCRF, SMF and other NFs of an operator). This rule may match traffic towards NFs of the operator from a number of NAS applications (e.g., any number of NAS applications) on the WTRU. In examples, a specific data network name (DNN) for CP traffic may be used. In one or more deployments, the NAS application ID may be an indication that NAS communication (e.g., any NAS communication) that is sent to the network via an IP-based connection may be considered to match the traffic descriptor.

The one or more information elements described herein may include a target ID, which may be one or more addresses enabling communicating with the NF. This may be a list of URIs or FQDNs. In examples, it may be an IP address or another type of ID. This ID may designate an NF (e.g., if using direct communication), an SCP/SSCP proxy (e.g., if using indirect communication), or an NRF (e.g., if using an NRF-based technique). URIs may enable specifying not only the FQDN of the hop (e.g., next hop), but the protocol for communicating with this hop (e.g., https or other types of service layer technologies).

The one or more information elements described herein may include an NF access technique, which may include one or more codes indicating the technique(s) allowed for communicating with the NF. In examples, values may include one or more of the following: NAS signaling (e.g., indicating that NAS messages may be used as currently used in 5G); SBA over IP (e.g., indicating that techniques described herein may be used to carry messages over HTTP over IP between WTRU and NF); SBA over IP associated with a label (e.g., direct/indirect, direct only, or indirect only, indicating that the WTRU may communicate with NF directly or through SCP/SSCP indirectly); SBA over IP-indirect associated with another label (e.g., scp/sscp, scp only, sscp only, indicating that the WTRU may communicate with NF through SCP/SSCP, SCP only, or SSCP only); and NRF-based (e.g., indicating that the WTRU may obtain the target ID and NF access technique from the NRF).

The procedure for selecting an NF access technique (e.g., as shown in FIG. 20) may include one or more of the following. The WWTRU/UCP may select one or more URSP rules. For example, this may be a rule matching the NAS application ID that generated the NAS message. In examples, this may be a rule matching the domain name of the NF FQDN (e.g., present in the NF profile provided by NAS application) or a rule matching a DNN (e.g., a single DNN associated by local configuration with all control plane communication or a DNN associated with an S-NSSAI present in the NF profile).

Rule selection may be performed using local UCP logic. For example, a UCP may select a single (e.g., highest presence) rule. In examples, the UCP may select multiple rules to increase the number of available route selection descriptors to choose from. This may enable UCP selecting, for example, multiple NF access techniques over multiple network interfaces.

The WTRU/UCP may select one or more route selection descriptors associated with selected rules.

Route selection descriptors selection may be performed using local UCP logic. For example, the UCP may select a single (e.g., highest precedence) route selection descriptor. In examples, the UCP may select multiple route selection descriptors. This may enable the UCP selecting, for example, multiple NF access techniques over multiple network interfaces. For example, WTRU/UCP may select multiple route selection descriptors and communicate with NRF/NF/SCP (e.g., as shown in FIG. 20) multiple times using different NF access techniques, different network interfaces, and/or different PDU sessions corresponding to the selected route selection descriptors. The WTRU/UCP may use different strategies (e.g., communicate with the first SCP/NF to reply, communicate with multiple NFs concurrently as a fail-safe, communicate with a same NF over multiple paths/SCP, etc.).

Establishing NRF communication may be provided. As described herein, a UCP may be present in the WTRU allowing NAS apps to utilize Model C or D type of SCP communication. While Model C may use NAS applications to discover NRFs themselves, e.g. through pre-configured URSPs, Model D may allow a more cloud-native realization of NAS apps where it is the UCP's responsibility to discover the NRF. In examples, the discovery process may trigger the following: what identifier is used for the NRF and/or how to route the NAS message to the NRF (e.g., and vice versa).

In an IP network, DNS may be used to resolve FQDNs into an IP address of the service endpoint which may serve the request. For this to work, a communication (e.g., routing of packets) across a set of computer networks may be feasible. For access networks (e.g., 3GPP access networks), the establishment of an RRC resource may allow the communication with the gNB from where a longest-prefix (e.g., IP routing) or arbitrary bitmask (e.g., name-based routing) matching-based network may be assumed towards the 5GC. In such a case, the NAS app (e.g., Model A or B) or UCP (Model C or D) aiming to communicate with the NRF may use the NRF's FQDN or IP address. This information may be provided in a pre-configured manner via URSPs, as described herein. As the routing domain starts at the gNB, two modes may foresee what logic the gNB implements to handle TLS-based HTTP messages from NAS applications, which may result in one or more of the following. If the NRF is identified through an IP address (e.g., IP address only), legacy gNBs may apply network address translation (NAT) techniques to replace the destination NRF IP address with the pre-configured default AMF one. If the NRF is identified through an IP address (e.g., IP address only) and a Nue interface is present, the next gNBs (ngNBs) may utilize their configured IP or NbR routing tables to allow the NAS app originated packet to be communicated to the NRF. If the UCP is different than the SCP that offers Nnrf access, the ngNB may act as an IP router performing NAT actions (e.g., replacing the original NRF's IP address with the one from the SCP) based on pre-configured rules for UCP/SCP addresses or may have the IP routing entries so that the IP packet may be routed to the SCP in its entirety. If no secondary SCP exists and the UCP has direct access to the Nnrf interface, the gNB may route the packet according to its IP or NbR routing table. If the NRF is identified through an FQDN, the UCP may configure a DNS nameserver entry for NAS apps, and may implement name-based routing and may follow the techniques described herein where the UCP responds with a public, e.g., reserved, IP address to satisfy the NAS app to issue the HTTP request, or the UCP may implement an IP-based UCP, which communicates the DNS request to the gNB which uses its configured IP routing entries to reach a dedicated DNS (e.g., NRF) to resolve the FQDN.

For access networks (e.g., non-3GPP access networks), the N3IWF may be reached via IP routing.

Using the service independent framework may be provided. How NAS services may be delivered independently may be provided. How the WTRU gets authorization to use network services (e.g., 3GPP networks services) and how the WTRU registers services available at the WTRU, thereby extending the service registration using similar techniques described herein, may be provided.

Figure 22:
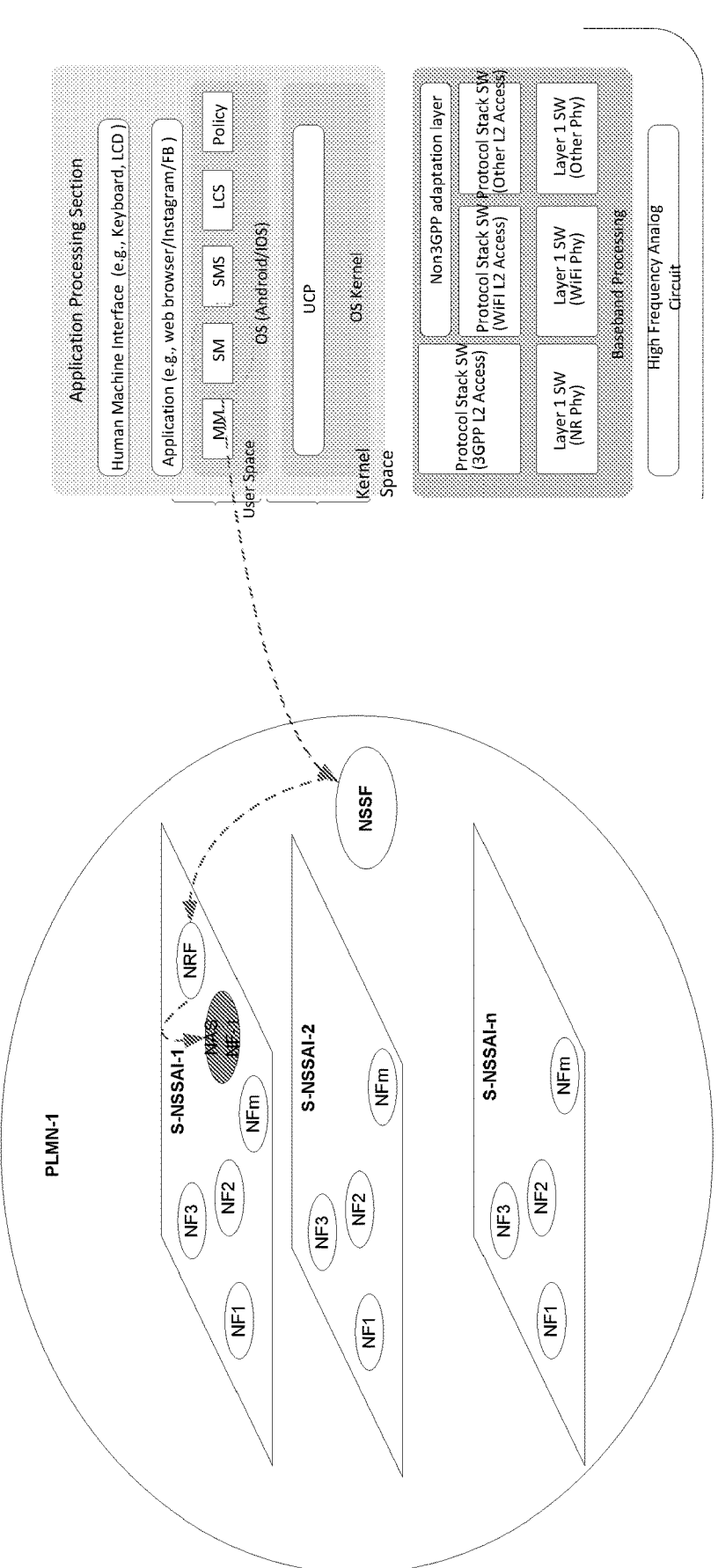
FIG. 22 is a diagram illustrating an example of NAS NF registration to public land mobile network (PLMN).

System registration and authorization may be provided. As shown in FIG. 22, the NAS NF or NAS app may register with a network slice within a particular PLMN as part of the initial WTRU network registration and authentication procedures. This procedure may obviate the use for the establishment of a signaling connection. Network initiated procedures triggered by a CN NF service may find the NAS NF app address using the WTRU registration context which may contain the NAS NF endpoint address or the S-NSSAI where NAS NF app is located, in which case the associated NRF may be used to find the NAS app. This may enable NAS applications to be included within network slices in a particular PLMN and the services and procedures that they deliver may be independently authenticated and independently accessed, e.g., as long as the WTRU has registered and authenticated with the associated PLMN.

As shown in FIG. 22, the SM app in the WTRU may register to an NRF within S-NSSAI-1. This may enable the WTRU to request session management services, e.g., even if other services are temporarily down. FIG. 22 shows an example of NAS NF registration to PLMN.

Figure 23:
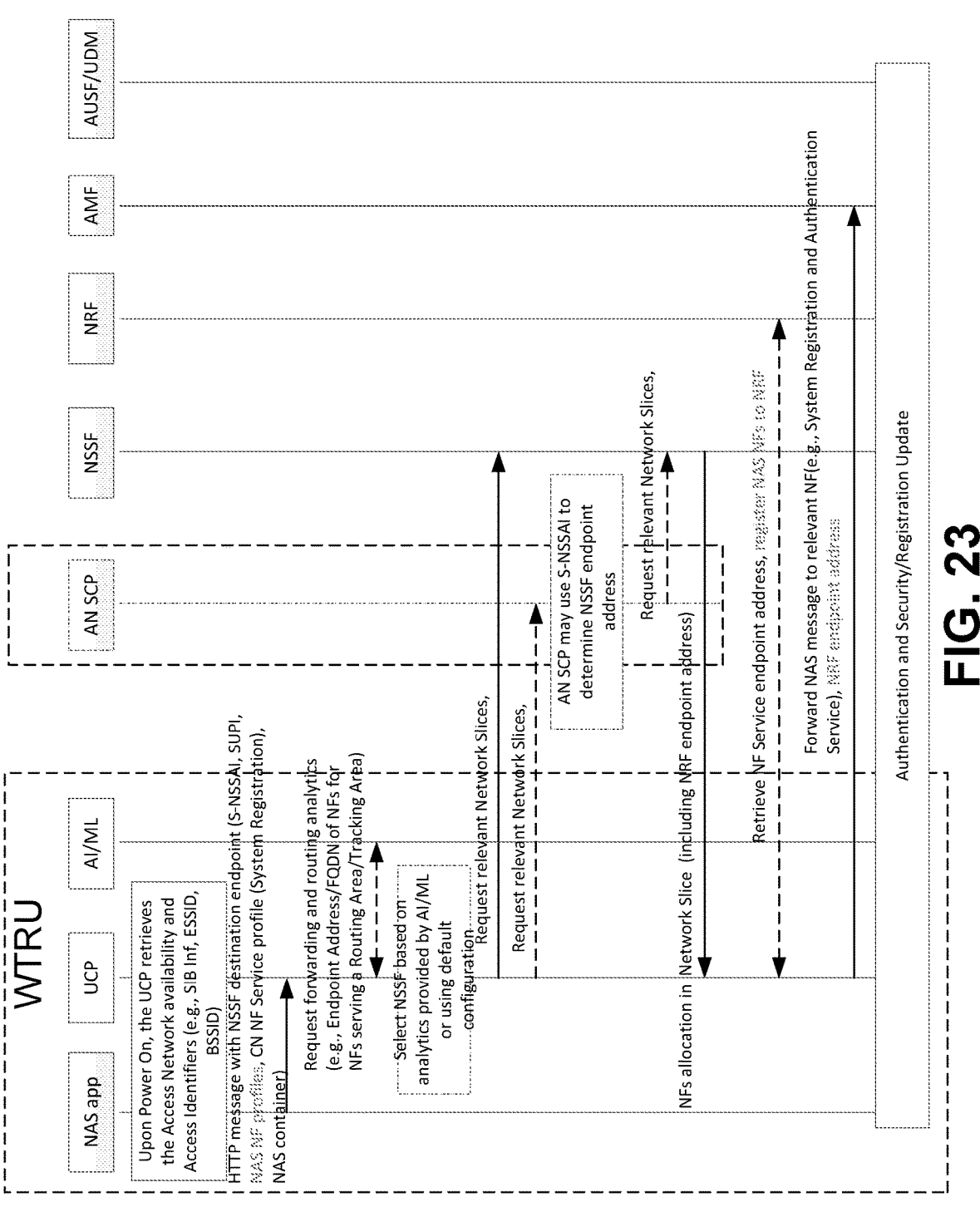
FIG. 23 is a diagram illustrating an example of a system registration and authorization procedure.

A system registration and authorization procedure may be provided. As shown in FIG. 23, the procedure whereby a WTRU uses the NAS service independent framework to register, authenticate, and obtain system access may be provided.

Modifications may be included in the procedure that allow an NAS app to get direct access to applications servers (e.g., 3GPP application servers), which may be referred to as network functions. By allowing direct access to the NSSF, the WTRU may find a suitable NF Service, which initially may refer to system access, registration, and authentication. The procedure may include one or more of the following.

FIG. 23 shows an example of a system registration and authorization procedure. Based on WTRU power-up, the UCP may retrieve access network details, including access network type (e.g., NR, Trusted Non-3GPP, or Un-Trusted 3GPP) and their availability. The UCP may provide access identifiers such as SIB information, ESSID, BSSIDs, and/or on the like. In examples, the UCP may be used to route messages (e.g., specific 3GPP messages) between an NAS app and NR layers such as RRC. NAS-specific messages (e.g., all NAS-specific messages) may be routed using HTTP messages. NAS service independent framework messages may be transparent to the access network and the resources used to transport them may be selected with priority (e.g., appropriate priority), e.g., using a QoS value (e.g., specific QoS value).

The NAS app layer may construct an HTTP message to carry the NAS container specific to the intended message. The specific S-NSSI (e.g., specific SST/SD combination), SUCI/SUPI, NAS NF Profile (e.g., system registration and authentication), CN NF service profile (e.g., AMF or a subset of it, such as registration and authentication service). Using mechanisms described herein, the UCP may derive endpoint addresses from target NFs services using AIML mechanisms by providing context that may enable the AIML engine to derive the endpoint address. The UCP may select a mechanism (e.g., appropriate mechanism) to derive the NSSF endpoint address.

The UCP may forward the HTPP message to the NSSF for allocating the appropriate S-NSSAI and possibly the NRF used by the UCP to find the CN NF service within the allocated network slice. In examples, an SCP may be allocated within an access network (e.g., specific access network) and this UCP may be used to route the message to an NSSF (e.g., specific NSSF). The UCP may use the S-NSSAI to find the NSSF endpoint address. The UCP may forward the HTTP message with the network slice information to the NSSF (e.g., appropriate NSSF).

The NSSF may allocate the requested network slice and may provide an NRF that may be used to find the CN NF service (e.g., appropriate CN NF service) endpoint identity of the registration and authentication service. The UCP may use the NRF to retrieve the CN NF service endpoint address and may register the NAS app service in the NRF so that CN NF services may contact it, e.g., if executing network initiated procedures involving a particular NAS app.

The UCP may forward the HTPP message (e.g., full HTPP message) with the relevant NAS container. In such a case, the NAS container may carry registration and authentication parameters that enable the WTRU to get access to the network.

Authentication and security procedure (e.g., 3GPP network authentication and security procedure) may be executed. Based on completion (e.g., successful completion) of these procedures, the WTRU may be deemed to be registered in the PLMN and specific network slice. The WTRU may independently authenticate the communication with CN NF services (e.g., specific CN NF services).

System support to enable operation over legacy access networks may be provided. Native 3GPP access networks (e.g., gNBs) and 3GPP-enabled Non-3GPP access networks (N3IWF) may expect certain functionality from the NAS layer to allow connectivity towards the core network. For example, the RRC may expect access identities and access restriction information from the NAS layer and other important information such as S-NSSAI. The NAS layer may use information (e.g., certain information) from the access network (e.g., system information such as PLMN IDs, tracking areas and cell identities).

As a means of providing backwards compatibility and a possible incremental deployment into legacy access networks, the NAS app may establish connectivity towards the core network over an access network (e.g., any access network), e.g., using NSSAI inclusion mode of operation "d" (e.g., the WTRU may not provide NSSAI in the access's stratum) and having the WTRU register with a default configured NSSAI corresponding to a network slice that supports direct access to NFs or introducing an S-NSSAI defined to enable the WTRU to register to a network slice that supports direct access to NFs, e.g., with a SST/SD combination. The WTRU's subscription may include one or more authorization parameters for direct NF access/connectivity towards the CN (e.g., terminating in the CN). The parameters may include one or more of the following: flag indicating whether the WTRU is authorized for such connectivity; the scope of such access (e.g., access to NFs in local PLMN, VPLMN, and/or HPLMN), or dedicated/specific S-NSSAI as described herein. Authorization parameters may include one or more dedicated/specific domain names that correspond to the core network domains towards which the WTRU is authorized to establish connectivity. The domains names may play a role similar to DNNs for N6 routing towards a DN but may be specific to connectivity towards the CN.

To enable the WTRU to establish initial connectivity to NFs in the core network (e.g., 3GPP core networks) using backwards compatible mechanisms, one or more of the following may apply. A procedure may be used, e.g., similar to the one realizing the control plane CIoT 5GS optimization feature in 3GPP 5G systems, which may enable the exchange user data between the WTRU and an NF over an NAS TRANSPORT connection. The WTRU may include, if sending a PDU session establishment/modification message, an IE, e.g., an IE within the existing 5GSM core network capability, that may be referred to as NAS Services, which the WTRU may use to signal its intent to transfer NAS messages to NFs within the system (e.g., 3GPP system) using an NAS TRANSPORT bearer. For example, the WTRU may use an NAS TRANSPORT connection to contact an SMF and, if this initial connection is made, the WTRU and the SMF may negotiate the establishment of a user plane connection to transport NAS app messages, via a UPF, without having to go over the initial N1 tunnel between the WTRU and the AMF.

Figure 25:
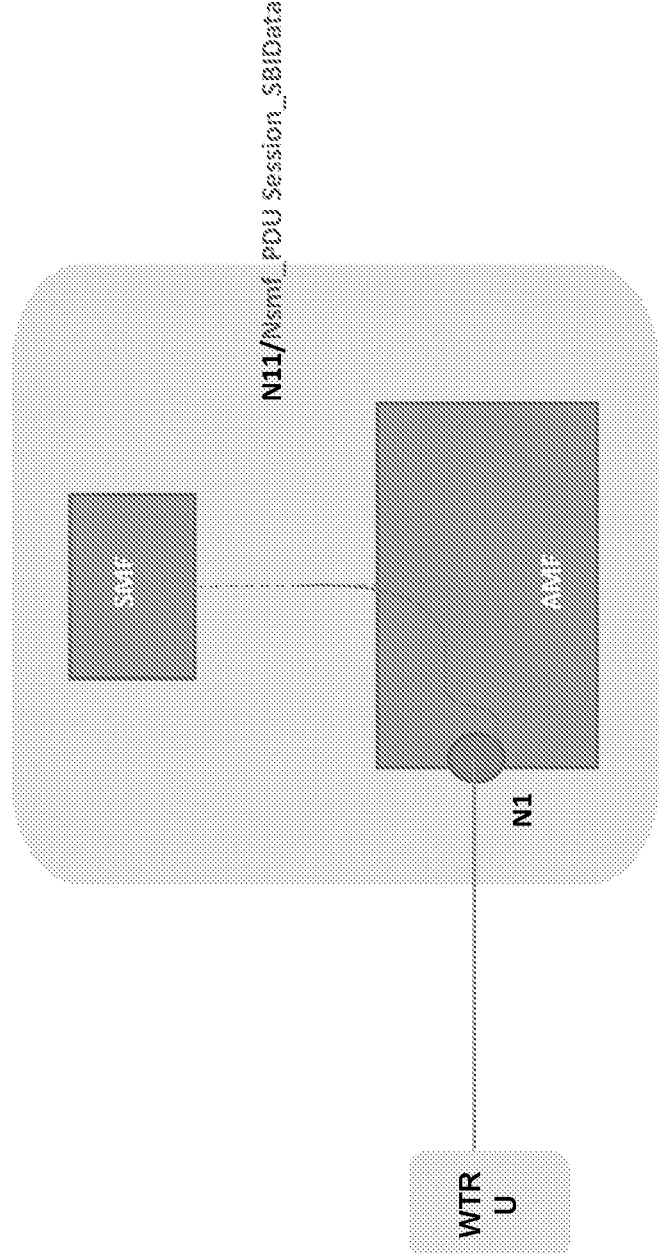
FIG. 25 is a diagram illustrating an example of transporting NAS app messages over a control plane (CP) connectivity.

To enable the WTRU to establish initial connectivity to NFs in the core network (e.g., 3GPP core networks) using backwards compatible mechanisms, one or more of the following may apply. As part of the negotiations, the WTRU may request to use existing PDU sessions, e.g., if there are any already set-up and they are allowed to carry this traffic, or it may request to enable user plane resources on the same PDU session used to transfer the initial NAS app messages between it and another NF (e.g., any other NF such as the SMF). The optimization feature may include the NAS TRASNPORT bearer being used to carry generic user data from the WTRU to a gateway (e.g., the UPF or the NEF). The WTRU may send an NAS app message to an NF (e.g., any 3GPP NF) using an NAS TRANSPORT bearer as shown in FIG. 25, e.g., in the same way as NFs use SBI to communicate to one another.

The N2 signaling connection between the AN and the CN may remain up, for example, even after the PDU Session is established over control plane resources as the SMF may not send N2 SM information which triggers the AMF to send an N2 downlink NAS transport message to carry NF DL NAS app message towards the WTRU, rather than a PDU session request. This may be used by the AN to know that no user plane resources are used.

Using the network slice type described herein, the WTRU may establish a data connection between the WTRU and NFs by using the S-NSSAI along with a DNN (e.g., specific DNN) that may correspond to the system (e.g., 3GPP system), for example, by using a mechanism akin to the establishment of an N19 to support 5GLAN connectivity. When the WTRU registers, it may provide its capability to support direct connectivity towards the CN. The AMF may authenticate the WTRU using a primary authentication procedure (e.g., conventional authentication procedure) and may verify against the WTRU subscription that the WTRU is authorized for direct connectivity towards the CN (e.g., based on parameters described herein). The WTRU may receive a response message from AMF indicating authorization to use direct CN connectivity, including applicable CN-connectivity parameters (e.g., specific slice/domain names to use for connectivity towards the CN). The WTRU may receive from an AMF an authorization token to enable the WTRU to request communication with an NF (e.g., invoke the NF RESTful API). The token may be securely bound to the WTRU identity and/or slice/domain/PLMN used for connectivity towards the CN. The WTRU may establish initial connectivity towards the CN using the allowed CN-connectivity parameters received during registration. In examples, the connectivity may be initiated/ enabled (e.g., implicitly initiated/enabled) by the AMF using a selected SMF capable of providing the used CN connectivity (e.g., may serve the specific slice and provide intra-CN domain routing).

Since in the system, the PSA UPF (e.g., PDU session anchor and/or the UPF anchoring the N6 interface) forwards user plane traffic to the N6 interface according to PDR rules, it may be important to set the rules so that the traffic may be allowed to remain within the network (e.g., 3GPP network), rather than being sent toward an N6 interface for routing over the Internet. Once the PDR is acted upon, NAS app packets may be routed to a destination, within the system (e.g., 3GPP system), using IP routing mechanisms. Traffic may be kept within the network (e.g., 3GPP network) using the PDR rule.

During initial connectivity, the WTRU may establish secure user plane data connectivity towards applicable NFs within the 3GPP system (e.g., an SMF) for transporting NAS app packets to enable NAS services.

In examples, if the WTRU sends a request for communication with an NF, it may present the authorization token described herein. The NF may verify authorization based on the provided token. The WTRU may be pre-provisioned with root certificates (e.g., for NFs in HPLMN) used for NF certificate verification during connection security establishment. The WTRU may receive root certificates (e.g., for VPLMN NFs) as part of the registration procedure. In examples, the WTRU may establish communication security with NFs using symmetric key mechanisms. The symmetric key (e.g., referred to as core network anchor key (CAK)) may be bootstrapped using WTRU subscription credentials analogous to how authentication and key management for applications (AKMA) may be used but for application function communication security. The CAK may be established by the WTRU and the CN (e.g., AUSF) as part of the primary authentication procedure by deriving the CAK from a network anchor key (e.g., KAUSF for an authorized WTRU that indicates direct CN-connectivity capability). The CAK may be registered/stored in an NF (e.g., core network anchor function (CAnF)) along with authorization scope parameters (e.g., allowed CN FQDNs and/or time validity). When the WTRU sends a request for communication with an NF, it may include the CAK ID in the request. The NF may locate and send a request for CAK from the CAnF based on the CAK ID. The CAnF may verify that the WTRU is authorized, and the NF may use the CAnF service (e.g., based on the presence of CAK, NF id/FQDN verse allowed CN FQDNs). The CAnF may derive a CN connectivity session key and provide it to the requesting NF. The WTRU derive the same session key to enable secure communication with the NF.

If a secure channel is established between the WTRU and the NF, the WTRU may establish a PDU session to transport NAS app packets towards the NF directly or through a UCP, e.g., either in addition to the initial connectivity channel or in place of it. Since the PDU sessions are established towards a special DNNs that refers to a network (e.g., 3GPP network), packets that are routed over these PDU Sessions may not have to traverse the Internet, e.g., instead PDR may be used to forward traffic inside the network (e.g., akin to how N19 or local switching connections may be used in 5GLAN networks).

Figure 24:
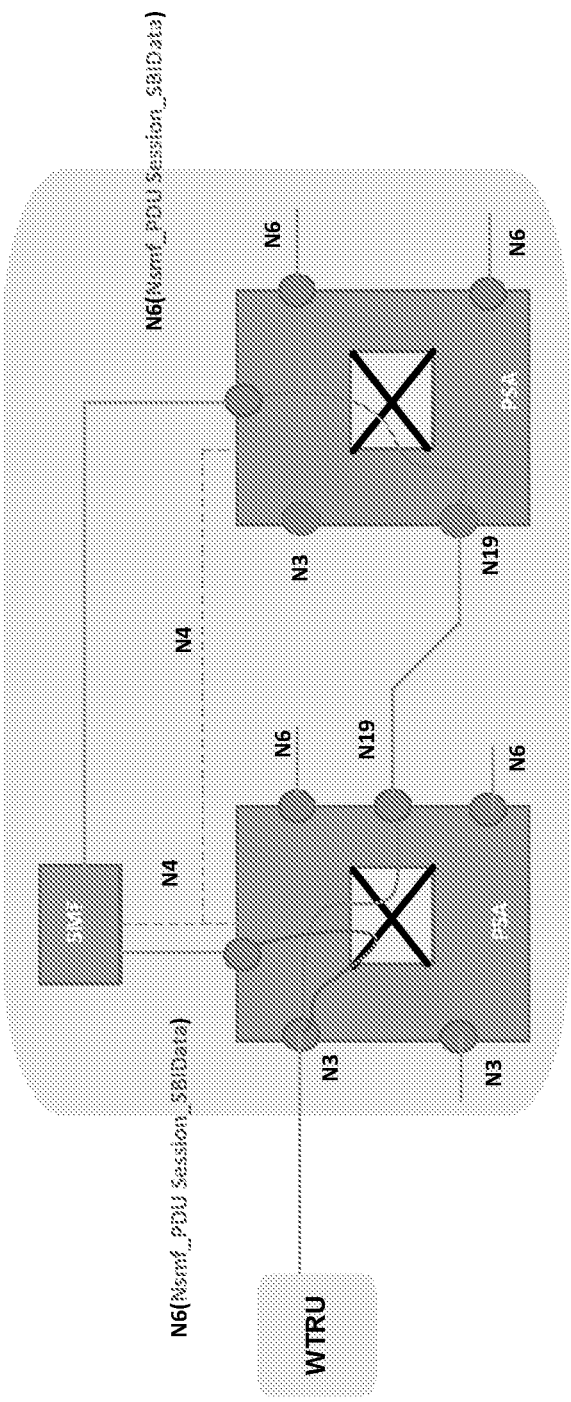
FIG. 24 is a diagram illustrating an example of transporting NAS app messages over a user plane (UP) connectivity.

As shown in FIGS. 24 and 25, the techniques described herein may be provided. The UP technique (e.g., as shown in FIG. 24) may use 5GLAN principles to connect to NFs over N19 or local switching, while the CP technique (e.g., as shown in FIG. 25) may use a mechanism akin to a CIoT CP optimization to negotiate NAS app connectivity. FIG. 24 shows an example of transporting NAS app messages over UP connectivity. FIG. 25 shows an example of transporting NAS app message over CP connectivity.

Indirect communication procedure using the service independent framework may be provided. An SSCP description may be provided. The control plane (e.g., 5G control plane)

may be realized using an SBA, which may use indirect communication through an SCP to benefit from certain features such as delegated discovery, message routing, traffic monitoring, and/or load balancing. In the system described herein, where WTRUs may access NAS services using HTTP-based SBA, using indirect communication (e.g., using SCPs in the network) may enable features such as topology hiding and enhanced communication security. Distributed SCP deployment may lead to higher risk for the SCP to be compromised by an attacker, providing access to clear text SBA communication. To address this, procedures for mobile networks to improve security of the indirect service-based control plane signaling may be used. This may be enabled by replacing a function with an HTTP/3 or HTTP/2 secure proxy specialized to realize similar functions.

An SSCP may be designed on CONNECT-based HTTP/3 proxy (e.g., using extended CONNECT HTTP/3 technique and QUIC protocol) or HTTP/2 proxy (e.g., using extended CONNECT HTTP/2 technique and TLS protocol). As described herein, it may be possible to implement functions of a traditional SCP into an SSCP, using explicit client-SSCP communication, for example, instead of having the SCP obtain information from, and place information into, the headers of the end-to-end communication. One or more SCP functions realized in an SSCP may have reduced or modified functionalities such as when analyzing or counting individual messages. SCP functions (e.g., most SCP functions) may be implemented using explicit client-SSCP communication, without impact on the function, as described herein.

To address the SSCP not being able to access clear text messages (e.g., including HTTP headers), the procedure, as shown in FIG. 24, may combine design elements from the QUIC protocol, HTTP proxies (e.g., using extended CONNECT and QUIC datagrams), and a mobile network service-based interface to enable a secure SCP. The client may place SBI headers in a CONNECT request to the SSCP.

The SSCP may provide services such as one or more of the following. As opposed to direct communication, the SSCP may enable topology hiding, since a WTRU may have to (e.g., only have to) discover (e.g., or be configured with) an SSCP identifier (e.g., an IP address or FQDN) and may not have to obtain the identifiers of individual NFs. As opposed to traditional indirect communication, SSCP may enable enhanced communication security, since WTRU-NF control plane communication may coalesce into one or more WTRU-SSCP communication sessions, which may hide communication patterns.

Techniques described herein may be applicable to SEPP. In examples, assuming that individual message filtering by SEPP is not deemed necessary, the procedure described herein may be applied to SEPP and may enable a secure SEPP (SSEPP) that may filter connections (e.g., allow/disallow connection between domains) and perform topology hiding without requiring SSEPP to access plain text proxied communication. The term SSCP may designate a secure SCP or secure SEPP.

SSCP may be deployed in a network node, a gateway (e.g., home or enterprise gateway), a gNodeB, or a WTRU. SSCP may be used as a proxy for traffic originated on an NF, a local WTRU, or a remote WTRU (e.g., a SSCP collocated with a relay WTRU may be used to proxy traffic from other WTRUs).

SSCP may enhance mobile network security. In a case where physical security is compromised and SSCP software is replaced with an infected software, the spying attack described herein for SCP may become impossible with SSCP, since by design SSCP may not access the request, response, nor indication messages. An infected SSCP software may perform a denial-of-service attack, for example, even if it enables visibly disrupting control traffic in a mobile network. This type of attacks may not enable undetectably recording control communication (e.g., all control communication) passing through the proxy. Using SSCP, for example at the edge of the network, may improve the security of a network (e.g., 5G/6G network). The procedures described herein may improve security by reducing the amount of information made available to the intermediate (e.g., SSCP) node.

A procedure for a client-server communication through an SSCP may be provided. The procedure, as described with respect to FIG. 24, may describe an implementation as described with respect to FIG. 20 if the SCP is an SSCP. In this procedure, a client may communicate securely end-to-end with a server through an SSCP that provides SBI services (e.g., including delegated discovery, message routing, traffic monitoring, and/or load balancing). This may be used in the context where the client is a WTRU and server is an NF or SCP, as described herein. This may be used in other contexts, e.g., where the client is a NF, and the service is another NF or SCP.

As shown in FIG. 24, a client (e.g., service producer or consumer such as NF, WTRU, or SCP) may initiate an HTTP/3 or HTTP/2 connection with an SSCP. If the client wishes to send messages to a server (e.g., service producer or consumer), the client may send a CONNECT message to the SSCP to request the creation of an end-to-end proxied connection with the server. The SSCP may provide service-based interface services (e.g., delegated discovery, routing, etc.). The SSCP may initiate a tunnel/transport connection to the server and from this point on may forward traffic between the server and the client. For example, the client may send request or indication messages to the server over the proxied end-to-end connection and the server may send replies to the client. In examples, a service consumer NF/WTRU may act as a client and a service-provider NF may act as a server. In examples, a service provider NF may act as a client, sending indication messages to a NF/WTRU that registered a callback URI with the service provider. SSCP may be integrated within a network (e.g., 5G network) using traditional SCP (e.g., and SEPP) nodes, in which case SCP or SEPP may have the role of the server or client in the procedure described herein (e.g., NF/UE may be configured to use/discover SSCP and SSCP may be configured to connect to an SCP).

Figure 26:
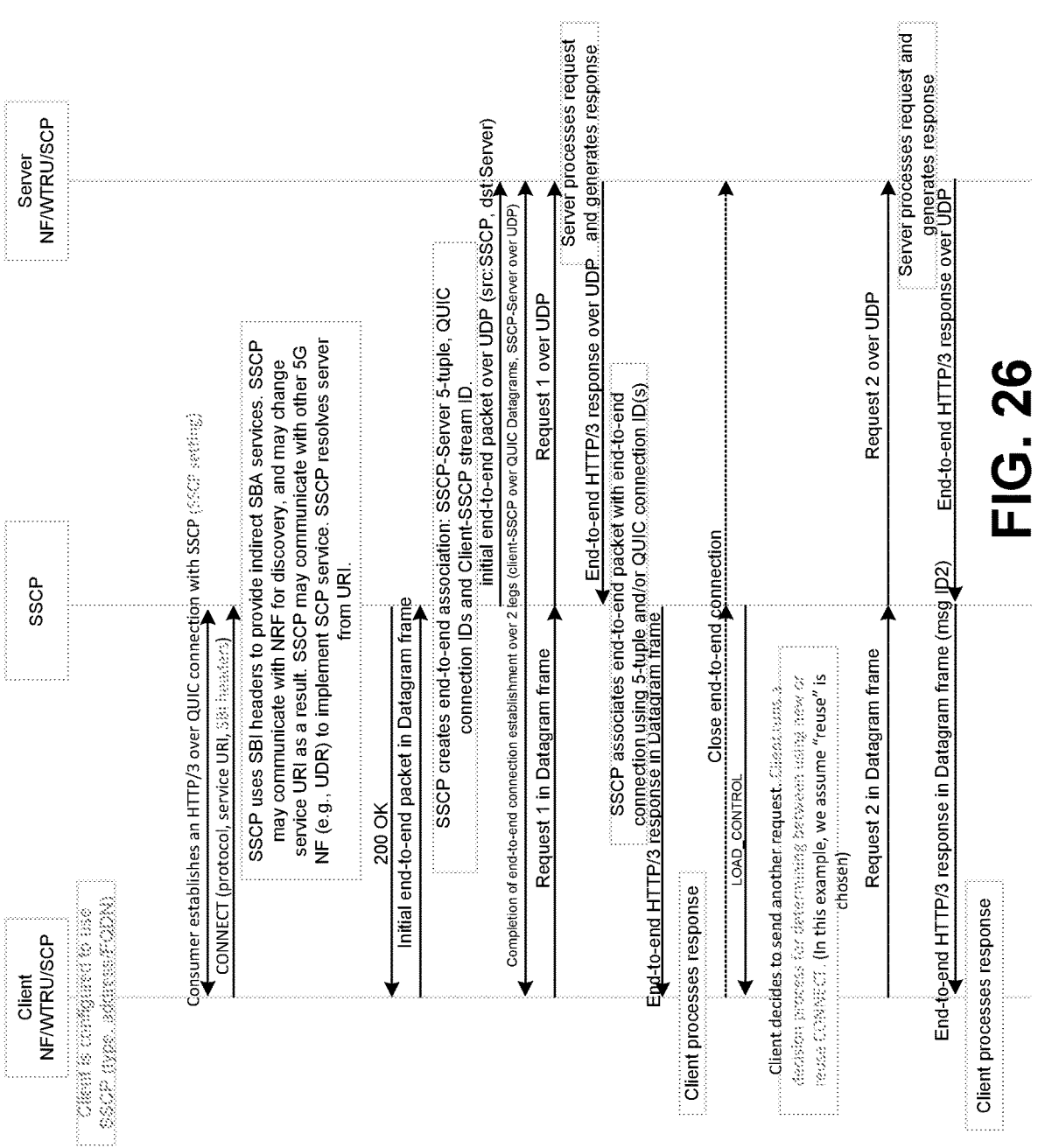
FIG. 26 is a diagram illustrating an example of a secure SCP (SSCP) operation procedure.

FIG. 26 shows an example of an SSCP operation procedure. The client and server may be an NF such as an AMF, SMF, or other NF collocated with a mobile network control node or an NF collocated on a WTRU (e.g., a software application running on a WTRU such as an NAS application running on a WTRU). The client NF may be a service consumer (e.g., sending requests to a service producer) or a service producer (e.g., sending indications to service consumer(s) identified by a callback URI provided upon subscription). In examples, the client may be an SCP (e.g., in a case where a client NF uses indirect communication) or SEPP (e.g., in a case where a client NF is in a visited network and needs to access a server NF in a home network). If SSCP is configured to connect through another SSCP, SSCP may establish (e.g., or reuse an existing connection) towards the next SSCP and may forward CONNECT and related datagram frames to the next hop SSCP. The final SSCP may communicate with the server as described with respect to FIG. 24.

WTRU/NF may be configured with SSCP information elements, including an SSCP address (e.g., FQDN or IP address and possibly a UDP port unless a default UDP port is used) and a proxy type "SSCP," which may be used to distinguish from an SCP proxy type. For example, as discussed herein, a WTRU may learn the SSCP address and type from URSP rules. In examples, the WTRU/NF may learn the SSCP address and type from a local configuration.

The client may decide to send a request to a server (e.g., a service consumer/client decides to communicate with a service provider/server). For example, a service provider/client may decide to send an indication to a service consumer/server.

The WTRU/NF may establish a QUIC connection with an SSCP. The SSCP and the client WTRU/NF may authenticate each other, e.g., using (e.g., SSL) certificates. SSCP may communicate with NFs (e.g., 5GS NFs) to assist in authenticating the client. The client and SSCP may advertise an SSCP setting in the HTTP (e.g., or QUIC) settings to indicate that features used in the procedure described herein are used. For example, a SSCP setting may be set to a default which may indicate a false value. This option may be used by the SSCP to indicate it accepts SBI headers in a CONNECT request from the client and it uses them to implement SBA indirect functions described herein. This option may be used by the client to indicate it supports sending SBI headers in a CONNECT request to the SSCP.

The client may send a CONNECT HTTP frame including, as parameters, a service URI and SBI headers. CONNECT may be an HTTP frame sent over a QUIC stream as other HTTP frames. The service URI may be used by SSCP to determine the destination server endpoint to establish a tunnel between the client and server over a single stream (e.g., the QUIC stream between client and SSCP over which the CONNECT frame was sent) to the destination server identified by the service URI (e.g., in a request-target HTTP header) and, e.g., if successful, the SSCP may forward data packets, e.g., in both directions, until the tunnel is closed. One or more SBI header fields may be parameters of the CONNECT frame. SBI header fields may enable the SSCP to provide indirect SBA services as follows. In examples, the SBI header fields herein and the associated SBA services described herein may be provided. Other fields and/or services may be supported, e.g., in a similar manner. The 3gpp-Sbi-Discovery-* header fields may be used by the SSCP to discover and select a suitable NF service producer (e.g., in case of service requests) or NF service consumer (e.g., in case of notifications or callbacks) as servers. In examples, a delegated discovery, based on SBI headers in CONNECT, including 3gpp-Sbi-Target-apiRoot or 3gpp-Sbi-Discovery-*, may include the SSCP discovering and selecting a suitable NF instance and NF service instance. As part of this process, the SSCP may communicate with an NRF. The client and SSCP may negotiate for indirect communication with delegated discovery using 3gpp-Sbi-Discovery-required-features in a CONNECT request. In examples, the SSCP may interact with UDR to resolve IDs used in the SBI header fields and/or server URI (e.g., UDM group ID, UDR group ID, AUSF group ID, PCF group ID, CHF group ID, HSS group ID based on WTRU identity such as SUPI or IMPI/IMPU). The SSCP may use the information from a cached discovery result (e.g., valid cached discovery result) for subsequent selections (e.g., the SSCP does not have to trigger an NF discovery procedure to perform the selection). In examples, based on a procedure without delegated discovery, the client may initially communicate with the NRF to discover the server NF and communicate (e.g., only communicate) with the server following the procedure as described with respect to FIG. 24.

Based on the provided SBI header fields described herein and provided the associated SBA services described herein, one or more of the following may apply. The 3gpp-Sbi-Nrf-Uri header field, using as value a URI, may be set by the client to indicate to the SSCP which NRF to use for discovery. Since the network slice used (e.g., N-SSAI) may be encoded in the NRF FQDN, the field may be used to convey the network slice/N-SSAI, by the WTRU, to the SSCP.

The 3gpp-Sbi-Routing-Binding header field, using as a value a binding information element, may direct the connection establishment to an HTTP server which has the targeted NF service resource context (e.g., NF service set ID, NF set ID, NF instance ID, or NF service instance ID).

The 3gpp-Sbi-Callback header field may indicate to the SSCP that this CONNECT is for sending one or more notifications/callbacks, which the SSCP may use to apply differentiated treatments for notification and callback requests compared to other service requests, e.g., for authorization (e.g., access token is not used in notification/callback).

The 3gpp-Sbi-message-priority header field, e.g., along with a priority value, may indicate a priority value to associate with the end-to-end connection. For example, the SSCP may use this priority for selecting a route for sending messages to the server, ordering of messages to relay with respect with messages from other end-to-end connections, overload throttling decision, and/or setting DSCP marking on UDP packets sent to the server. Priority may be changed dynamically by the client using a CONTROL capsule frame described herein. The server may dynamically influence priority by setting a 3gpp-Sbi-Message-Priority header value in a message to the client. Based on reception, the client may decide to update the priority of the end-to-end connection (e.g., or start an end-to-end connection with a new CONNECT).

The 3gpp-Sbi-Max-Forward-Hops header field, e.g., along with a value may include a number of hops and possibly a node type (e.g., "5; nodetype=sscp"). The SSCP may use this header for detection and handling of loop path by decrementing the hop count (e.g., for sscp node type) prior to forwarding a CONNECT to the next SSCP. Authorization-related SBI header fields may be present (e.g., scope and/or token for OAuth 2.0). SSCP may use the headers to authorize usage of the SSCP by the client. End-to-end authorization may be performed end-to-end between client and server.

If the SSCP is configured to connect through another SSCP, the SSCP may establish an HTTP/3 connection with the next SSCP and may forward the CONNECT message to the next SSCP. An SSCP (e.g., any, all, or the last SSCP) in the proxy chain may provide the indirect SBA services. In such a case, the SSCP may forward DATAGRAM frames and other messages between the client and the next SSCP.

The SSCP may respond to the CONNECT with a 200 OK HTTP response. From this point on, the SSCP may restrict its behavior to blind forwarding of packets, e.g., in both directions. The SSCP may wait and piggyback the 200 OK response with a response from the server (e.g., wait for a response packet from the server to be available as described herein and send the 200 OK along with the response, resulting in both the QUIC packets to be sent in a single UDP datagram if possible). This may be useful to limit the number of UDP datagrams. The 200 OK message from the SSCP may include SBI headers, such as 3gpp-Sbi-Producer- Id, using as a value an identifier of the server (e.g., NF service producer) which was selected by SSCP.

The SSCP may create a data structure to track the state of the end-to-end connection between client and server. The SSCP may use the SBI headers to implement indirect SBA services, as described herein (e.g., the SSCP uses 3gpp-Sbi-Discovery-* headers to implement delegated discovery, etc.). The SSCP may communicate with other NFs (e.g., 5G NFs such as NRF and/or UDR), may change the service URI as a result of delegated discovery, and may resolve the service URI domain name to obtain the server's (e.g., IPv4 or IPv6) address. The SSCP may associate the stream ID used for the CONNECT with the end-to-end connection (e.g., using an end-to-end connection data structure).

The SSCP may perform monitoring over the encrypted end-to-end connection. SSCP may count end-to-end connections, number of connections from/to specific clients and servers, number of connections to the NF, service instances, and instance sets, and/or estimated number of messages (e.g., by counting packets back and forth and grouping them into independent request/response using heuristics based on packet size and timing). In examples, if statistics (e.g., detailed statistics) are used by the operator, clients and/or servers may communicate detailed statistics information to an NF dedicated to the collection of such information.

The WTRU may send the first end-to-end message (e.g., an HTTP/3 request message) in packet(s) encapsulated in DATAGRAM frame(s) or DATAGRAM capsule frame(s) (e.g., may be referred to as DATAGRAM frame). The WTRU may send this first packet possibly starting before receiving a response to the CONNECT, for example, which may enable the request packet(s) to be coalesced with the CONNECT request into a single UDP datagram sent to the SSCP.

The end-to-end QUIC connection may be authenticated and encrypted between the client and server. Application-layer communication security may be performed end-to-end between the client and server (e.g., authorization of the NF service consumer to access the NF service producer API).

The SSCP may associate the datagram described herein with the end-to-end connection using the QUIC stream ID (e.g., which is encoded in QUIC datagrams) and/or QUIC connection IDs. If the SSCP is not configured to connect through another SSCP, the SSCP may send the initial end-to-end packet received from the client, over UDP towards the server, using a UDP connection which may be dedicated or shared with other clients. SSCP may determine the transport characteristics of the flow towards the server (e.g., a 5-tuple, a source SSCP and destination server IP address and port, as well as the protocol, which may be a UDP or a TCP connection, a VPN connection, etc.) The SSCP may associate the 5-tuple with the end-to-end connection. The SSCP may initiate the transport connection with the server, e.g., by sending an initial UDP packet to the server. The SSCP may send the initial packet(s) to the server, e.g., including the initial end-to-end packet(s) from the DATAGRAM frame(s) as described herein. If the SSCP is configured to connect through another SSCP, the SSCP may forward the DATAGRAM frame towards the next SSCP and the last SSCP in the proxy chain connects with the server.

The server may reply to the initial packet(s) and the SSCP may forward the response to the client. At this point, the end-to-end connection may be established over 2 legs: client-SSCP over QUIC datagrams and SSCP-Server over UDP.

The legs of the end-to-end connection (e.g., client-SSCP leg and SSCP-server leg) may be multiplexed with legs of other end-to-end QUIC/TLS connections. For example, this may enable grouping end-to-end control plane connections (e.g., all end-to-end control plane connections) from a client NF to multiple control plane NFs inside a single connection to an SSCP (e.g., which may result in hiding internal operator's network IP addresses from observers). This may enable grouping multiple end-to-end control plane connections towards an NF inside a single SSCP-NF transport connection (e.g., a single UDP flow). If multiple end-to-end connections are grouped in a single UDP flow between the SSCP and server, the server and SSCP may use QUIC connection IDs present in end-to-end QUIC packets to map end-to-end QUIC packets to individual client-server connections.

The client may complete sending the initial request to the server through SSCP using packets.

The server may process the request and generate a response (e.g., PCF as a server replies to a request for policy information from SMF as a client).

The server may send the end-to-end response to the SSCP over the transport connection to the SSCP as described herein. The response may be sent as an HTTP frame. The SSCP may associate this end-to-end packet with the end-to-end connection using the 5-tuple of the SSCP-server connection and/or QUIC connection IDs. The SSCP may retrieve the stream ID associated with this end-to-end connection and may forward the end-to-end packet towards the client in a DATAGRAM frame associated with the QUIC stream using this ID. The response from the server may include a binding indication. If it is different from the binding information used in the CONNECT request, the client NF may send another CONNECT with binding information before sending a message (e.g., any message) to the service (e.g., before the next message or before re-sending the initial message if the reply from the NF was a redirection message). Based on receiving the response from the server, the client may process the response.

For load and/or overload control, the SSCP may send a message (e.g., an HTTP request in a PUSH stream or piggybacking on an HTTP response to an unrelated request from the client) including HTTP header fields (e.g., "3gpp-Sbi-Oci" using overload control information (OCI) as a value and "3gpp-Sbi-Lci" using load control information (LCI) as a value) and/or HTTP status code. Based on reception, the client may take local action (e.g., throttle down sending rate) and/or update/add OCI header fields in an end-to-end message towards the server to elicit a load control action by the server.

The SSCP may send (e.g., spontaneously send) an HTTP message to the client, including SBI headers, to provide indirect SBA services described herein (e.g., to indicate a change of priority, load or overload condition, and/or the like). The SSCP may send an HTTP message including a body or header indicating an error, warning, or redirection, if an error not related to a specific message from the client occurs in the SSCP.

The client may decide to send another request. The client may run a decision process to determine whether to reuse the same end-to-end connection over the same QUIC stream ID or not. Part of this decision process may include deciding whether the server binding may change. In such a case, the client may decide to re-initiate an end-to-end connection through SSCP, which may lead to the selection of a different server instance. A decision process for determining between using new or reuse CONNECT may include one or more of the following. If one or more of the following is true, the client may decide to re-initiate an end-to-end connection (e.g., new end-to-end encryption) through SSCP. The server may have provided a change of binding in SBI headers in end-to-end message. The client application may have decided to change the binding. A client WTRU mobility event (e.g., if NF is collocated with the WTRU) may have occurred. Change of priority may have been decided by a client or provided by server (e.g., 3gpp-Sbi-Message-Priority). An event may have been received by an NF (e.g., mobility event for a WTRU-related to the request). A periodic event may have occurred (e.g., a timer on the client). In examples, a timer on the SSCP may trigger a reply to the next message from the client with a retry error HTTP response.

The client may decide to reuse the same end-to-end connection.

The client may send a request to the server through SSCP, (e.g., similarly to techniques described herein).

The procedure as described with respect to FIG. 24 may be adapted to use HTTP/2, e.g., instead of HTTP/3. In the adapted procedure, the client may connect to the SSCP using HTTP/2 and may use CONNECT instead of extended CONNECT. Following the CONNECT request, end-to-end HTTP messages may be forwarded through a CONNECT-based HTTPS proxy.

The procedure as described with respect to FIG. 24 may be adapted to use NAS protocol instead of HTTP/3 for tunneling WTRU-NF end-to-end HTTP/IP traffic. In the adapted procedure, the client may connect to an SSCP, e.g., collocated with an AMF or located in the core network, using messages placed in a container carried over an NAS message, e.g., using an SSCP code as a destination ID. AMF may forward the messages to the SSCP, e.g., using a tunnel based on UDP, IP, and/or TCP to transport the messages to the SSCP. The SSCP may provide network services (e.g., including end-to-end connectivity establishment and forwarding towards NF) as described herein.

To send an indication to a service consumer that requested it, a service provider may use the procedure as described with respect to FIG. 24, where it takes the roles of the client, using the callback URI as service URI in the CONNECT request. As a result, the SSCP may establish an end-to-end connection to the service consumer acting as a server. In examples, instead of using the procedure as described with respect to FIG. 24, if the service consumer/client is currently connected to the service provider/server, the service provider/server may use the HTTP feature "server PUSH" to send an HTTP request to the client, end-to-end through the SSCP.

In a system design (e.g., current 5G system design), Signaling radio bearers may be shared by slices (e.g., all slices) that are supported by a base station. In examples, if the WTRU sends an NAS session management message to the network in an NAS message, the base station may not be aware of what slice is associated with the NAS session management message. The base station may forward the NAS message to an AMF, the AMF may determine what slice the session management message is associated with, and the AMF may forward the message to an SMF that is associated with the slice.

In a system design (e.g., current 5G system design), data radio bearers may be used by the WTRU and network to send data plane messages. PDU sessions may be used to send data plane messages. The network and WTRU may associate PDU sessions with data plane radio bearers. The system (e.g., 5G system) may be able to allocate DRBs to network slices, dedicate DRBs to network slice(s) (e.g., certain network slice(s), allocate different amounts of DRBs to different network slices, etc. The system design (e.g., 5G system design) may allow data to be sent over the control plane using SRBs (e.g., via the 3GPP control plane CIoT 5GS optimization feature). Whether or not data is sent over the control plane (e.g., SRBs) or over the data plane (e.g., DRBs) may be configured on a per PDU sessions basis.

How to send NAS messages between a WTRU and network functions in HTTP messages may be provided. In the system (e.g., current 5G system), signaling radio bearers may be used by the WTRU and the network to send and receive NAS messages. By using the procedures described herein to send NAS messages in HTTP Messages, the WTRU and network may be able to be configured to send NAS messages over data radio Bearers or signaling radio bearers. The system may have the option to avoid using SRBs to send and receive session management messages, SMS messages, policy control messages, and/or location services messages. The system may use DRBs to send session management messages, SMS messages, policy control messages and/or location services messages. Whether or not SRBs or DRBs are used for NAS messages may be based on how the associated PDU session is configured (e.g., whether the PDU Session is configured to use the control plane or the data plane). The DRBs or SRBs that are used to send session management messages, SMS messages, policy control messages and/or location services messages may be associated with a slice and/or PDU session that is dedicated to carrying control messages. In examples, the DRBs or SRBs that may be used to send a session management message, SMS message, policy control message and/or location services message may be associated with the same slice that is associated with the session management message, SMS message, policy control message and/or location services message.

In the system design (e.g., current system design), the base station may not be aware of what slice is associated with the NAS session management message. As described herein, if NAS messages are sent from within a PDU session and the PDU session is configured to use the control plane, the NAS messages may be sent using SRBs. In such a case, the base station may know what slice an NAS message (e.g., each NAS message) is associated with based on the PDU session context information.

As described herein, NAS messages may carry session management messages, SMS messages, policy control messages and/or location services messages. If aa NAS message carries a session management message, the session management information is sent between the WTRU and an SMF. If an NAS message carries an SMS message, the session management information may be sent between the WTRU and an SMSF. When a NAS message carries a policy control message, the session management information may be sent between the WTRU and a PCF. If an NAS message carries location services messages, the session management information may be sent between the WTRU and an LCS. If session management messages, SMS messages, policy control messages and/or location services messages are sent in an HTTP message, they may be referred to as something other than NAS messages. For example, they may be referred to as control payloads. For example, if the message is associated with a particular slice or S-NSSAI, they may be referred to as slice specific control payloads.

Accordingly, systems, methods, and instrumentalities are disclosed for a wireless transmit/receive unit (WTRU) configured to communicate application layer non-access stratum (NAS) messages for accessing a NAS network service to a network node. The WTRU may determine that it has a need to request a NAS network service and may generate an application layer NAS message that comprises the request for the NAS network service. The WTRU may determine, based on configuration information, one or more network nodes adapted to provide NAS network services. The WTRU may determine, based on analytics data and policy data, a first network node in the one or more network nodes to which the application layer NAS message may be sent. The WTRU may determine, based on the policy data, one or more parameters for sending the application layer NAS message to the first network node. The WTRU may determine an endpoint address associated with the first network node. The WTRU may send the application layer NAS message to the first network node using the endpoint address and the one or more parameters.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising:
a processor configured to:
determine an application layer non-access stratum (NAS) message, the application layer NAS message indicating a request for a network service;
determine, based on configuration information, one or more network nodes configured to provide NAS services;
determine, based on analytics data and policy data, a first network node of the one or more network nodes to send the application layer NAS message to;
determine, based on the policy data, one or more parameters for sending the application layer NAS message to the first network node;
determine an endpoint address associated with the first network node; and
send the application layer NAS message to the first network node using the endpoint address and one or more parameters.

2. The WTRU of claim 1,
wherein the first network node is a network function (NF) configured to provide the network service.

3. The WTRU of claim 1,
wherein the processor configured to send the application layer NAS message to the first network node is further configured to send the application layer NAS message to a service communication proxy (SCP), the SCP configured to forward the application layer NAS message to a NF configured to provide the network service.

4. The WTRU of claim 1,
wherein the processor configured to send the application layer NAS message to the first network node is further configured to send the application layer NAS message using an application layer protocol.

5. The WTRU of claim 1,
wherein the processor configured to determine the endpoint address associated with the first network node is further configured to:
send a request for the endpoint address to a network repository function (NRF); and
receive a response indicating the endpoint address.

6. The WTRU of claim 1,
wherein the policy data comprises one or more rules for selecting parameters for communicating with the first network node.

7. The WTRU of claim 6,
wherein the one or more rules are determined based on a NAS application identifier associated with the network service.

8. The WTRU of claim 1,
wherein the one or more parameters for sending the application layer NAS message to the first network node comprise information indicating implementations for sending communications to the first network node.

9. The WTRU of claim 8,
wherein the information indicating implementations for sending communications to the first network node comprises information indicating one of direct communication with the first network node or indirect communication with the first network node.

10. A method of communicating non-access stratum (NAS) messages, comprising:
a wireless transmit and receive unit (WTRU) determining an application layer non-access stratum (NAS) message, the application layer NAS message indicating a request for a network service;
the WTRU determining, based on configuration information, one or more network nodes configured to provide NAS services;
the WTRU determining, based on analytics data and policy data, a first network node of the one or more network nodes to send the application layer NAS message to;
the WTRU determining, based on the policy data, one or more parameters for sending the application layer NAS message to the first network node;
the WTRU determining an endpoint address associated with the first network node; and
the WTRU sending the application layer NAS message to the first network node using the endpoint address and one or more parameters.

11. The method of claim 10,
wherein the first network node is a network function (NF) configured to provide the network service.

12. The method of claim 10,
wherein sending the application layer NAS message to the first network node comprises sending the application layer NAS message to a service communication proxy (SCP), the SCP configured to forward the application layer NAS message to a NF configured to provide the network service.

13. The method of claim 10,
wherein sending the application layer NAS message to the first network node comprises sending the application layer NAS message using an application layer protocol.

14. The method of claim 10,
wherein determining the endpoint address associated with the first network node further comprises:
sending a request for the endpoint address to a network repository function (NRF); and
receiving a response indicating the endpoint address.

15. The method of claim 10,
wherein the policy data comprises one or more rules for selecting parameters for communicating with the first network node.

16. The method of claim 15,
wherein the one or more rules are determined based on a NAS application identifier associated with the network service.

17. The method of claim 15,
wherein the one or more parameters for sending the application layer NAS message to the first network node comprise information indicating implementations for sending communications to the first network node.

18. The method of claim 17,
wherein the information indicating implementations for sending communications to the first network node comprises information indicating one of direct communication with the first network node or indirect communication with the first network node.

19. A wireless transmit/receive unit (WTRU) comprising:
a processor configured to:
determine an application layer non-access stratum (NAS) message, the application layer NAS message indicating a request for a network service;
determine, based on configuration information, one or more network nodes configured to provide NAS services;
determine, based at least on policy data, a first network node of the one or more network nodes to send the application layer NAS message to;
determine, based on the policy data, one or more parameters for sending the application layer NAS message to the first network node;
determine an endpoint address associated with the first network node; and
send the application layer NAS message to the first network node using the endpoint address and one or more parameters.

20. The WTRU of claim 19,
wherein the processor configured to determine, based at least on the policy data, the first network node of the one or more network nodes to send the application layer NAS message to is further configured to determine, based at least on the policy data and analytics data, the first network node of the one or more network nodes to send the application layer NAS message to.

* * * * *